(12) United States Patent
Zhang et al.

(10) Patent No.: US 11,394,018 B2
(45) Date of Patent: Jul. 19, 2022

(54) LITHIATED TRANSITION METAL OXIDES

(71) Applicant: Xerion Advanced Battery Corp., Champaign, IL (US)

(72) Inventors: Huigang Zhang, Champaign, IL (US); John D. Busbee, Beavercreek, OH (US); Hailong Ning, Champaign, IL (US); Kevin A. Arpin, Champaign, IL (US)

(73) Assignee: XERION ADVANCED BATTERY CORP., Champaign, IL (US)

( * ) Notice: Subject to any disclaimer, the term of this patent is extended or adjusted under 35 U.S.C. 154(b) by 29 days.

(21) Appl. No.: 16/817,818

(22) Filed: Mar. 13, 2020

(65) Prior Publication Data

US 2020/0274140 A1 Aug. 27, 2020

Related U.S. Application Data

(63) Continuation of application No. 15/701,639, filed on Sep. 12, 2017, now abandoned, which is a (Continued)

(51) Int. Cl.
*H01M 4/04* (2006.01)
*C25D 9/06* (2006.01)
(Continued)

(52) U.S. Cl.
CPC ...... *H01M 4/0454* (2013.01); *C01G 45/1221* (2013.01); *C01G 51/42* (2013.01);
(Continued)

(58) Field of Classification Search
None
See application file for complete search history.

(56) References Cited

U.S. PATENT DOCUMENTS 3,166,615 A 1/1965 Farrell
3,489,540 A 1/1970 Cook
(Continued)

FOREIGN PATENT DOCUMENTS

EP 0801152 10/1997
EP 3172169 3/2005
(Continued)

OTHER PUBLICATIONS

Gu et al., Non-aqueous electrodeposition of porous tin-based film as an anode for lithium-ion battery, Journal of Power of Sources, 2012, 214: 200-207.
(Continued)

*Primary Examiner* — Christopher P Domone
(74) *Attorney, Agent, or Firm* — Bryan Cave Leighton Paisner LLP

(57) ABSTRACT

Process for the fabrication of an electrode structure comprising an electrochemically active material suitable for use in an energy storage device. The method includes electrodepositing the electrochemically active material onto an electrode in electrodeposition bath containing a non-aqueous electrolyte. The electrode structure can be used for various applications such as electrochemical energy storage devices including high power and high-energy lithium-ion batteries.

35 Claims, 13 Drawing Sheets

Related U.S. Application Data continuation of application No. 15/362,993, filed on Nov. 29, 2016, now Pat. No. 9,780,356, which is a continuation of application No. 14/806,066, filed on Jul. 22, 2015, now abandoned.

(60) Provisional application No. 62/132,871, filed on Mar. 13, 2015, provisional application No. 62/027,550, filed on Jul. 22, 2014.

(51) Int. Cl.

| | | |
|---|---|---|
| C25D 9/08 | (2006.01) | |
| H01M 4/1391 | (2010.01) | |
| C25D 9/12 | (2006.01) | |
| H01M 4/80 | (2006.01) | |
| H01M 4/66 | (2006.01) | |
| C01G 45/12 | (2006.01) | |
| C01G 51/00 | (2006.01) | |
| C01G 53/00 | (2006.01) | |
| C25D 9/04 | (2006.01) | |
| H01M 4/131 | (2010.01) | |
| H01M 4/133 | (2010.01) | |
| H01M 4/36 | (2006.01) | |
| H01M 4/485 | (2010.01) | |
| C25D 17/10 | (2006.01) | |
| H01M 4/75 | (2006.01) | |
| H01M 10/0525 | (2010.01) | |
| H01M 4/02 | (2006.01) | |
| C25D 21/02 | (2006.01) | |
| H01M 4/74 | (2006.01) | |
| H01M 4/525 | (2010.01) | |
| H01M 4/587 | (2010.01) | |

(52) U.S. Cl.
CPC .............. *C01G 53/44* (2013.01); *C25D 9/04* (2013.01); *C25D 9/06* (2013.01); *C25D 9/08* (2013.01); *C25D 9/12* (2013.01); *C25D 17/10* (2013.01); *H01M 4/0404* (2013.01); *H01M 4/131* (2013.01); *H01M 4/133* (2013.01); *H01M 4/1391* (2013.01); *H01M 4/366* (2013.01); *H01M 4/485* (2013.01); *H01M 4/661* (2013.01); *H01M 4/663* (2013.01); *H01M 4/75* (2013.01); *H01M 4/80* (2013.01); *H01M 10/0525* (2013.01); *C01P 2002/54* (2013.01); *C01P 2002/72* (2013.01); *C01P 2002/82* (2013.01); *C01P 2006/40* (2013.01); *C25D 21/02* (2013.01); *H01M 4/525* (2013.01); *H01M 4/587* (2013.01); *H01M 4/747* (2013.01); *H01M 4/806* (2013.01); *H01M 4/808* (2013.01); *H01M 2004/021* (2013.01); *H01M 2220/30* (2013.01); *Y02E 60/10* (2013.01)

(56) References Cited

U.S. PATENT DOCUMENTS

| | | | |
|---|---|---|---|
| 3,707,136 | A | 12/1972 | Kostas |
| 5,968,685 | A | 10/1999 | Harada et al. |
| 6,552,843 | B1 | 4/2003 | Tench et al. |
| 6,680,013 | B1 | 1/2004 | Stein et al. |
| 6,680,143 | B2 | 1/2004 | Thackeray et al. |
| 7,183,433 | B2 | 2/2007 | Abbott et al. |
| 8,237,538 | B2 | 8/2012 | Braun et al. |
| 9,780,356 | B2 * | 10/2017 | Zhang .................. C01G 53/44 |
| 10,090,529 | B2 | 10/2018 | Arpin et al. |
| 10,886,523 | B2 * | 1/2021 | Ates .................. C25D 9/08 |
| 2001/0054226 | A1 | 12/2001 | Yoshimura et al. |
| 2001/0054555 | A1 | 12/2001 | Yoshimura et al. |
| 2005/0048371 | A1 | 3/2005 | Nagayama et al. |
| 2008/0246580 | A1 | 10/2008 | Braun et al. |
| 2009/0303660 | A1 | 12/2009 | Nair et al. |
| 2010/0068623 | A1 | 3/2010 | Braun et al. |
| 2010/0151318 | A1 * | 6/2010 | Lopatin .................. H01M 4/13 429/163 |
| 2012/0040246 | A1 * | 2/2012 | Sakai .................. H01M 4/623 205/159 |
| 2012/0219844 | A1 | 8/2012 | Tsutsumi et al. |
| 2012/0301387 | A1 | 11/2012 | Neumann |
| 2013/0196235 | A1 | 8/2013 | Prieto et al. |
| 2013/0292255 | A1 | 11/2013 | Inoue et al. |
| 2014/0170303 | A1 * | 6/2014 | Rayner .................. C25D 5/48 216/75 |
| 2015/0118572 | A1 | 4/2015 | Lund et al. |
| 2016/0028081 | A1 | 1/2016 | Zhang et al. |
| 2017/0077490 | A1 | 3/2017 | Zhang et al. |
| 2018/0212226 | A1 | 7/2018 | Zhang et al. |
| 2019/0100850 | A1 | 4/2019 | Ates et al. |
| 2020/0274140 | A1 | 8/2020 | Zhang et al. |
| 2021/0230762 | A1 | 7/2021 | Ates et al. |

FOREIGN PATENT DOCUMENTS

| | | |
|---|---|---|
| KR | 100583229 | 5/2006 |
| WO | 9705062 | 2/1997 |
| WO | 2016014658 | 1/2016 |

OTHER PUBLICATIONS

Armand et al., Ionic-liquid materials for the electrochemical challenges of the future, Nature Materials, vol. 8, pp. 321-629 Jul. 24, 2009.

Chen et al., Molten Salt Synthesis and High Rate Performance of the "Desert-Rose" form of LiCoO2, Advanced Materials, vol. 20, pp. 2206-2210 2008.

Freyland, W., Chapter 2—Liquid metals, Molten Salts, and Ionic Liquids: Some Basic Properties, Coulombix Fluids, Springer Series in Sold-State Sciences 168, pp. 5-45 2011.

Gao et al., Room-temperature synthesis of crystallized LiCoO2 thin films by electrochemical technique, Journal of Alloys and Compounds, vol. 509, pp. 697-703 Jul. 7, 2010.

Han et al., Soft solution processing for fabrication of lithiated thin-film electrodes in a single synthetic step, Journal of Materials Chemistry, vol. 8(9), pp. 2043-2048 1998.

Han et al., Direct Electroplating of Lithium Cobalt Oxide Film on Platinum Substrate in 100-200C Aqueous Solution, Journal of American Ceramic Society, vol. 85[110], pp. 2444-2448 Jul. 15, 2002.

Han et al., Simultaneous and Direct Fabrication of Lithium Cobalt Oxide Film and Powder Using Soft Solution Processing at 100C, Electrochemical and Solid-State Letters, vol. 2(2), pp. 63-66 1999.

Han et al., Soft Solution Processing for direct fabrication of LiMO2 (M=Ni and Co) film, Solid State Ionics 151, pp. 11-18 2002.

Ispas et al., Electrodeposition in Ionic Liquids, The Electrochemical Society Interface, pp. 47-51 2014.

Kuk et al., The formation of LiCoO2 on a NiO cathode for a molten carbonate fuel cell using electroplating, Journal of Materials Chemistry, vol. 11, pp. 630-635 Dec. 19, 2000.

Lee et al., Fabrication of LiCoO2 films for lithium rechargeable microbattery in an aqueous solution by electrochemical reflux method, Electrochimica Acta 50, pp. 467-471 Oct. 6, 2004.

Machefaux et al., Preparation of nanowires of M substituted manganese dioxides (M=Al, Co, Ni) by the electrochemical-hydrothermal method, Journal of Physics and Chemistry on Solids, vol. 67, pp. 1315-1319 2006.

Niedermeyer, Mixtures of ionic liquids, Chemical Society Review, vol. 41, pp. 7780-7802 May 11, 2012.

Porthault et al., One step synthesis of lamellar R-3m LiCoO2 thin films by an electrochemical-hydrothermal method, Electrochimica Acta, vol. 56, pp. 7580-7585 Jul. 1, 2011.

Song et al.. Effect of LiOH concentration change on simultaneous preparation of LiCoO2 film and powder by hydrothermal method, Sold State Ionics 135, pp. 277-281 2000.

(56) References Cited

OTHER PUBLICATIONS

Suryanto et al., Controlled electrodeposition of cobalt oxides from protic ionic liquids for electrocatalytic water oxidation, Royal Society of Chemistry RSC Advances, pp. 20936-20942 Sep. 2, 2013.

Tao et al., Synthesis mechanism of lithium nickel oxide using hydrothermal-electrochemical method: Thermodynamic modelling and experimental verification, Physica B 362, pp. 76-81 Jan. 30, 2005.

Zhou et al., Electrodeposited McOx Films from Ionic Liquid for Electrocatalytic Water Oxidation, Advanced Energy Materials, vol. 2, pp. 1013-1021 2012.

European Patent Office, Extended European Search Report issued for App. No. 15825174.4; Pub. No. 3172169, 10 pages Jan. 5, 2018.

Arora et al., Battery separators, Chemical Reviews, 2004, 104: 4419-4462.

Long et al. Three-dimensional battery architectures. Chemical Reviews 2004, 104(10), 4463-4492.

Lee et al., Synthesis and Rate Performance of Monolithic Macroporous Carbon Electrodes for Lithium-Ion Secondary Batteries, Advanced Functional Materials, 2005, 15(4): 547-556.

Zhang et al., Three-dimenstional bicontinuous ultrafast-charge and -discharge bulk battery electrodes, Nature NI-anotechnology, 2011, 6(5): 277-281.

Patent Cooperation Treaty, International Search Report for PCT/US2015/041515, dated Nov. 3, 2015, 4 pages.

Patent Cooperation Treaty, International Search Report for PCT/US15/41520, dated Nov. 18, 2015, 4 pages.

Extended European Search Report for EP 21185385.8 dated Jan. 25, 2022.

* cited by examiner

LITHIATED TRANSITION METAL OXIDES

CROSS-REFERENCE TO RELATED APPLICATIONS

The present application claims priority as a continuation application of Ser. No. 15/701,639, filed on Sep. 12, 2017, which is a continuation of Ser. No. 15/362,993 now U.S. Pat. No. 9,780,356, filed on Nov. 29, 2016, which is a continuation of Ser. No. 14/806,066, filed on Jul. 22, 2015, which claims priority to provisional application 62/132,871, filed on Mar. 13, 2015 and provisional application 62/027,550, filed on Jul. 22, 2014, each of which is hereby incorporated by reference in their entireties herein.

The present disclosure generally relates to a method for electrodepositing a lithiated transition metal oxide composition that may be adapted for use in filtration devices, heat sinks, structural components, energy storage devices such as primary and secondary batteries, fuel cells and capacitors, and a range of articles incorporating porous open-cell structures. In one such exemplary embodiment, the lithiated transition metal oxide composition is an anodically active or a cathodically active material and is incorporated into a monolithic porous open-cell structure adapted for use as, or as a component of, a primary or secondary battery.

Rocking chair or insertion secondary batteries are a type of energy storage device in which carrier ions, such as lithium, move between a positive electrode and a negative electrode through an electrolyte. Lithium ion (Li-ion) batteries are popular power sources for consumer electronics and the emerging flexible and wearable electronics such as watches, glasses, sensors, healthcare devices, etc. Conventional Li-ion batteries typically have rectangular, cylindrical or button form factors. With the increasing emphasis on flexible and wearable electronics, Li-ion batteries must meet the demands for flexibility and shape variety. For example, a curved mobile phone would benefit from a curved battery, a pair of eyeglasses would benefit from a battery that conforms to the marginally available space, and healthcare devices worn on waists would benefit from flexible batteries. Accordingly, new battery fabrication technologies are required.

One conventional method for the preparation of lithium ion batteries involves the preparation of an electrochemically active powder, mixing the electrochemically active powder with conductive agents such as carbon black and a binder (e.g., polyvinylidene fluoride) to form a slurry, and casting the slurry onto the surface of a current collector, typically a planar (i.e., a two-dimensional surface). A continuous electron pathway is based on the connection of conductive agent, electrochemically active particles, and current collectors. Bending or twisting the battery, however, could loosen the particle connection and lead to the apparent capacity loss. Due to the intrinsic limitation of powder size, slurry preparation, casting process, and the usage demands, it appears unlikely that this conventional method will be capable of satisfying the evolving demands of evolving consumer electronics for more complex shapes, flexibility and greater energy density per unit area.

There are also numerous reports of conventional polymeric foams with larger pore sizes that, when coated with metallic materials, can be implemented in battery electrode designs. One example in particular utilized three different porous substrates including a carbon-coated urethane foam, carbon-coated bonded organic fibers, and nonwoven carbon fabric. For example, in EP 0801152 B1, Tsubouchi et al. disclose conformally coating porous templates with iron by electrodeposition to form a highly porous metal structure useful for battery electrodes.

More recently, Braun et. al. demonstrated a highly porous nickel structure coated with a battery active material that is capable of ultrafast charge and discharge. See, e.g., Zhang, H. G., Yu, X. D., & Braun, P. V., Three-dimensional bicontinuous ultrafast-charge and -discharge bulk battery electrodes. Nature Nanotechnology 6 (5), 277-281 (2011) and Zhang, H., Yu, X., & Braun, P. V., U.S. Pat. No. 8,237,538 B2. The enhanced power performance of these electrodes is attributed to the reduced ion and electron transfer lengths. The highly porous nickel structures were fabricated by the template directed electrodeposition of nickel. The template used was an ordered arrangement of polystyrene colloids, commonly termed a colloidal crystal. After nickel electrodeposition, the template was removed, resulting in a porous nickel structure, termed an inverse colloidal crystal.

In U.S. Pat. No. 6,680,013, Stein et al. disclose a similar method to form highly porous conductive structures. As disclosed therein, ordered arrangements of organic polymer colloids were infiltrated with inorganic precursors for metals and metal alloys. Following template removal, the precursors were converted to the metallic form resulting in a highly porous conductive structure. Stein et al. also published similar methods to make highly porous carbon (also conductive) structures for lithium-ion battery applications; see, Lee, K. T., Lytle, J. C., Ergang, N. S., Oh, S. M., & Stein, A., Synthesis and rate performance of monolithic macroporous carbon electrodes for lithium-ion secondary batteries. Advanced Functional Materials 15 (4), 547-556 (2005).

Despite the advances made to-date, a need remains for an improved process for the preparation of monolithic porous open-cell structures that may be incorporated into storage devices such as primary and secondary batteries, fuel cells and capacitors, filtration devices, heat sinks, structural components.

Among the various aspects of the present disclosure, therefore, may be noted the provision of lithium transition metal oxide compositions and structures adapted for storage devices such as primary and secondary batteries, fuel cells and capacitors, filtration devices, heat sinks, and other structural components.

Advantageously, and in accordance with one aspect of the present disclosure, a monolithic porous open-cell electrode structure adapted for use as an electrode in a primary or secondary battery may be obtained directly via electrodeposition (e.g., the structure is adapted for use in the as-deposited state), thus obviating the need for combining a powder of the transition metal oxide composition with a binder and conductive material to form a paste, and then molding or otherwise applying the paste to a current collector or other structure.

Additionally, or alternatively, in certain embodiments the lithium transition metal oxide compositions may be electrodeposited at relatively low temperatures (e.g., less than 400° C.) and incorporated into a battery in the as-deposited state, thus obviating the need for a high-temperature annealing (e.g., annealing at a temperature of at least about 700° C.) to improve the crystallinity of the material.

Additionally, or alternatively, in certain embodiments the lithium transition metal oxide compositions may be electrodeposited at relatively low temperatures (e.g., less than 400° C.) onto a flexible substrate (e.g., a flexible current collector) to form a flexible composite structure adapted for use as an electrode in a primary or secondary battery.

Briefly, therefore, one aspect of the present disclosure is a process for the direct electrodeposition of lithium transition metal oxide onto a current collector to form an integrated active material layer.

A further aspect of the present disclosure is a method of forming a lithiated transition metal oxide comprising the steps of (i) immersing a working electrode into a non-aqueous electrolyte comprising a lithium source and a transition metal source, (ii) electrodepositing a lithiated transition metal oxide onto a surface of the working electrode from the electrolyte at a temperature in excess of the melting temperature of the non-aqueous electrolyte, (iii) removing the working electrode from the bath and (iv) rinsing the electrodeposited lithiated transition metal oxide.

A further aspect of the present disclosure is a method of forming a lithiated transition metal oxide comprising the steps of (i) immersing a working electrode into a molten salt electrolyte comprising a lithium source and a transition metal source, (ii) electrodepositing a lithiated transition metal oxide onto a surface of the working electrode from the electrolyte at a temperature in excess of the melting temperature of the molten salt electrolyte, (iii) removing the working electrode from the bath and (iv) rinsing the electrodeposited lithiated transition metal oxide.

A further aspect of the present disclosure is a primary or secondary battery comprising a lithiated transition metal oxide prepared by an electrodeposition method disclosed herein.

A further aspect of the present disclosure is a composite structure comprising a conformal coating of a lithiated transition metal oxide on a carbon scaffold.

A further aspect of the present disclosure is a primary or secondary battery comprising a composite structure, the composite structure comprising a conformal coating of a lithiated transition metal oxide on a carbon scaffold.

A further aspect of the present disclosure is a lithiated cobalt oxide composition comprising a metastable O-2 phase. This O-2 phase is capable of being converted to the O-3 phase upon annealing at a temperature in the range of about 300 to 400° C.

Other objects and features will be in part apparent and in part pointed out hereinafter.

BRIEF DESCRIPTION OF THE DRAWINGS

Corresponding reference characters indicate corresponding parts throughout the drawings.

Definitions

Figure 1A:
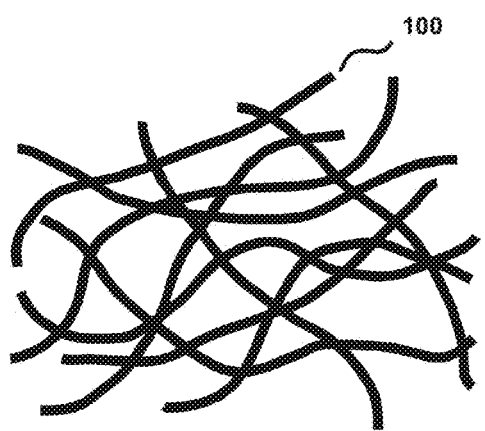
FIG. 1(a) is a schematic of a 3-dimensional conductive scaffold (100). It could be carbon nanotube mat, carbon microfiber mat, porous carbon, porous metal foam or their composites.

The term "aspect ratio" as used in connection with an interconnectivity window of a unit cell of a porous structure is the ratio of the largest dimension of the interconnectivity window to the smallest dimension of the interconnectivity window that is orthogonal to the largest dimension of the interconnectivity window as viewed in a representative two-dimensional cross-section of the porous structure.

The term "aspect ratio" as used in connection with a unit cell of a porous structure is the ratio of the largest dimension of the unit cell to the smallest dimension of the unit cell that is orthogonal to the largest dimension as viewed in a representative two-dimensional cross-section of the porous structure.

The term "average aspect ratio" as used in connection with the interconnectivity windows of the unit cells of a porous structure is the arithmetic mean of the aspect ratios of a representative sample size of at least 20 interconnectivity windows of the unit cells of the porous structure and preferably at least 50 interconnectivity windows of the unit cells of the porous structure as viewed in a representative two-dimensional cross-section of the porous structure.

The term "average aspect ratio" as used in connection with the unit cells of a porous structure is the arithmetic mean of the aspect ratios of a representative sample size of at least 20 unit cells of the porous structure and preferably at least 50 unit cells of the porous structure as viewed in a representative two-dimensional cross-section of the porous structure. In those embodiments in which there exists a gradient of unit cell size, the unit cells included as part of the representative sample size span the entire gradient.

The term "relative standard deviation" as used herein in connection with a characteristic (e.g., aspect ratio or size) is the standard deviation divided by the mean value for that characteristic expressed as a percentage. For example, the relative standard deviation as used in connection with the size of a unit cell within a population is the quotient of the standard deviation for the unit cell size and the mean unit cell size, expressed as a percentage.

The term "size" as used in connection with an interconnectivity window of a unit cell is the largest dimension of the interconnectivity window of the unit cell as viewed in a representative two-dimensional cross-section of the porous structure.

The term "size" as used in connection with a unit cell is the largest dimension of the unit cell as viewed in a representative two-dimensional cross-section of the porous structure.

An "anodic electrodeposition" as used herein is an electrochemical oxidization reaction that leads to deposition on the working electrode by applying negative voltage/current.

A "cathodic electrodeposition" as used herein is an electrochemical reduction reaction which leads to deposition on the working electrode by applying positive voltage/current.

An "electroactive material" or "electrochemically active material" as used herein is a material having the capacity to function as an anode material or a cathode material in an energy storage device such as a secondary battery.

An "electrodepositable material" as used herein is a material capable of being electrochemically deposited onto an electrically conductive substrate under the influence of an applied electrical potential/current.

A "foil" as used herein refers to a thin and pliable sheet of metal.

A "molten salt" as used herein is a salt in the liquid state comprising inorganic and/or organic ions When introducing elements of the present disclosure or the preferred embodiments(s) thereof, the articles "a", "an", "the" and "said" are intended to mean that there are one or more of the elements. The terms "comprising", "including" and "having" are intended to be inclusive and not exclusive (i.e., there may be other elements in addition to the recited elements). Additionally, the use of the singular includes the plural and plural encompasses singular, unless specifically stated otherwise. Furthermore, the use of "or" means "and/or" unless specifically stated otherwise.

EMBODIMENTS

One aspect of the present disclosure is a method for electrodepositing lithiated transition metal oxide compositions having a range of uses. For example, the ceramics produced by this method are adapted for use in filtration devices, heat sinks, structural components, primary, batteries, secondary batteries, fuel cells, capacitors, and a range of articles incorporating monolithic porous open-cell structures. In one such exemplary embodiment, the lithium transition metal oxide may be an anodically active material adapted for incorporation into the anode of a primary or secondary battery or it may be a cathodically active material adapted for incorporation into the cathode of a primary or secondary battery. More specifically, in one such embodiment the lithium transition metal oxide is incorporated into secondary batteries in which the positive electrode and negative electrode are disposed in complex geometries (i.e., nonplanar).

In general, the electrodeposition method comprises immersing a working electrode and a counter-electrode into an electrolyte, and electrodepositing a lithiated transition metal oxide ceramic onto at least a portion of the working electrode as electric current is passed between the two electrodes. In one embodiment, the electrodeposition is an anodic electrodeposition. In another embodiment, the electrodeposition is a cathodic electrodeposition. Advantageously, in some embodiments the electrodeposited composition is an electrochemically active material that may be incorporated, as-is, into the anode or cathode of an energy storage device such as a secondary battery.

Figure 1B:
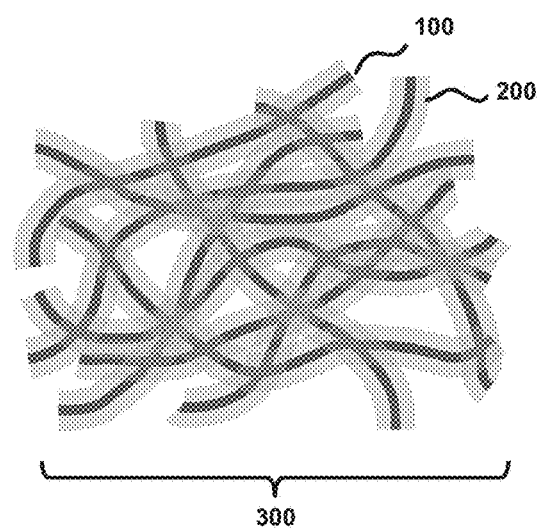
FIG. 1(b) is a schematic of an integrated composite electrode (300) comprising a conformal, electrodeposited lithium transition metal oxide (200) layer on the conductive scaffold of FIG. 1(a).

Referring now to FIGS. 1A and 1B, in one exemplary embodiment a lithiated transition metal oxide 200 is electrochemically deposited onto a porous, open-cell structure 100. For ease of illustration, the porous, open-cell structure 100 is depicted as a fibrous network. As described in greater detail herein, the lithiated transition metal oxide may also be electrochemically deposited onto a wide range of substrates having a wide range of geometries. Advantageously, the methods disclose herein permit conformal deposition onto the surfaces of the substrates, including non-line of site surfaces within porous, open-cell structures.

Figure 2:
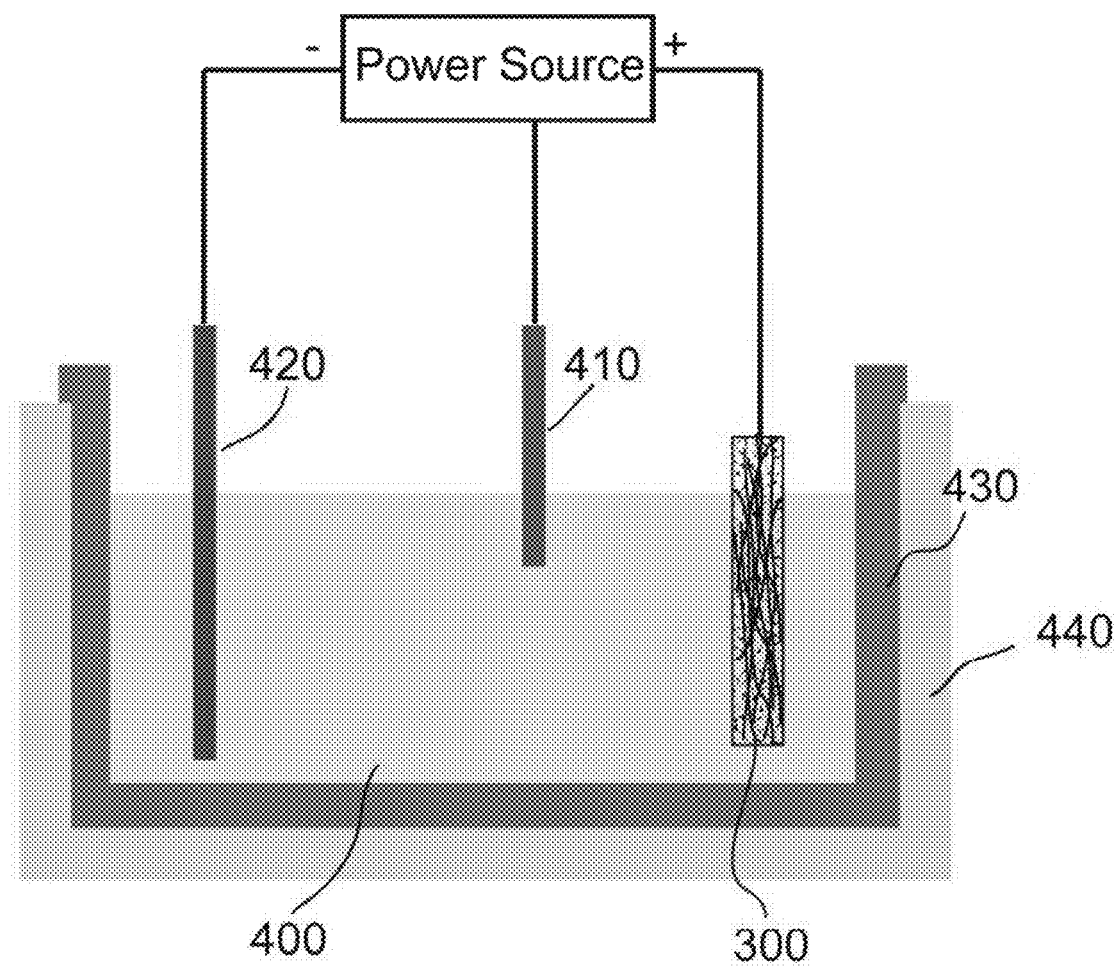
FIG. 2 is a schematic of electrodeposition apparatus for the deposition of a lithium transition metal oxide composition in accordance with one embodiment of the present disclosure.

Referring now to FIG. 2, in one embodiment a process of the present disclosure is carried out in an electrodeposition apparatus generally indicated at reference numeral 10. The electrodeposition apparatus includes working electrode 300, counter-electrode 420, bath 430 for containment of electrolyte 400, and a heating mantle (440) for heating the electrolyte. Working electrode 300 provides a substrate (sometimes referred to as a scaffold) onto which an electrochemically active ceramic comprising a lithiated transition metal oxide may be deposited. The working electrode 300 and counter electrode 420 are connected to the power source, which applies a voltage sufficient to deposit the electrochemically active material at a desired rate. A pseudo-reference electrode 410 may optionally also be provided.

The electrodeposition apparatus may also optionally include a porous separator (not shown) between the working electrode and the counter-electrode. When electrodeposition is completed, the working electrode is removed from the bath and preferably rinsed to remove residual salt.

Electrically conductive substrates suitable for use as the working electrode 300 and the counter-electrode 420 may comprise metals, metal alloys, ceramics, carbon (including all of the allotropes thereof), electrically conductive polymers, and electrically conductive composite materials. Exemplary conductive metals and metal alloys include aluminum, copper, chromium, cobalt, manganese, nickel, silver, gold, tin, platinum, palladium, zinc, tungsten, tantalum, rhodium, molybdenum, titanium, iron, zirconium, vanadium, and hafnium, and the alloys thereof. Examples of conductive ceramics include borides, carbide, and silicides such as titanium boride, hafnium boride, magnesium boride, chromium boride, vanadium boride, aluminum boride, tungsten carbide, titanium carbide, chromium carbide, molybdenum carbide, hafnium carbide, tantalum carbide, vanadium carbide, tungsten silicide, titanium silicide, vanadium silicide, nickel silicide, platinum silicide, chromium silicide, copper silicide, and zirconium silicide. Examples of conductive oxides include indium tin oxide and fluorinated tin oxide. Examples of conductive allotropes of carbon include conductive carbon particles, carbon nanotubes, carbon fibers, fullerenes, graphene, graphite, glassy carbon, pyrolitic carbon and the like. Exemplary conductive polymers include polyaniline, polyacetylene and polypyrrole. Exemplary conductive composite materials include polymeric materials containing a sufficient amount of conductive filler such as particles, fibers, or sheets; the filler material may comprise, for example, any of the conductive carbon materials listed above. In accordance with one aspect of the present disclosure, the working electrode may have any of a wide range of geometries. In some embodiments, for example, the lithiated transition metal oxide ceramic is electrodeposited onto a substantially planar surface such as a sheet or foil. In other embodiments the lithiated transition metal oxide ceramic is electrodeposited onto the surface(s) of a three dimensional working electrode. For example, the lithiated transition metal oxide ceramic may be electrodeposited onto the surface(s) of a three-dimensional working electrode having a regular geometric shape such as prismatic, cuboidal, pyramidal, truncated pyramidal, conical, truncated conical, cylindrical, domed cylindrical, truncated cylindrical, barrel, or spherical shaped three-dimensional structure. By way of further example, in some embodiments the ceramic may be electrodeposited onto the surface(s) of a three-dimensional working electrode having a three-dimensional complex shape (i.e., a three-dimensional structure that is a combination of two or more shapes, sometimes also known as a compound figure or compound shape) such as an open pore porous structure, or a fibrous network. For example, in one embodiment the ceramic is electrodeposited onto a composite or other material, optionally porous or fibrous, having an engineered or molded three-dimensional complex shape. By way of further example, in one embodiment, the three-dimensional working electrode may be composed of both carbon and a metalized (metal) current collector.

In one embodiment, the working electrode comprises an electrically conductive porous structure. For example, in some embodiments the working electrode has a void volume fraction (porosity) of at least about 25%. For example, in one embodiment the working electrode has a void volume fraction (porosity) of at least about 35%. By way of further example, in one embodiment the working electrode has a void volume fraction (porosity) of at least about 50%. By way of further example, in one embodiment the working electrode has a void volume fraction (porosity) of at least about 60%. By way of further example, in one embodiment the working electrode has a void volume fraction (porosity) of at least about 75%. By way of further example, in one embodiment the working electrode has a void volume fraction (porosity) of at least about 90%. By way of further example, in one embodiment the working electrode has a void volume fraction (porosity) of at least about 95%. By way of further example, in one embodiment the working electrode has a void volume fraction (porosity) of at least about 99%. Working electrodes having a porous structure may be prepared by any of a range of techniques. For example, in one embodiment the working electrode is prepared by colloidal assembly, interference lithography, direct writing of multifunctional inks, direct laser writing in a photoresist, layer by layer stacking of components fabricated by conventional 2D lithography, block co-polymers or dealloying.

In one exemplary embodiment, the electrically conductive porous structure comprises unit cells have an average size in the range of about 10 nm to about 100 µm. For example, in one such embodiment the unit cells have an average size in the range of about 10 nm to 50 µm. By way of further example, in one such embodiment the unit cells have an average size in the range of about 10 nm to about 25 µm. By way of further example, in one such embodiment the p unit cells have an average size in the range of about 10 nm to about 10 µm. By way of further example, in one such embodiment the unit cells have an average size in the range of about 100 nm to about 10 µm. By way of further example, in one such embodiment the unit cells have an average size in the range of about 100 nm to about 5 µm. By way of further example, in one such embodiment the unit cells have an average size in the range of about 0.2 µm to about 2 µm. By way of further example, in one such embodiment the unit cells have an average size in the range of about 0.4 µm to about 2 µm. By way of further example, in one such embodiment the unit cells have an average size in the range of about 0.5 µm to about 1.5 µm.

In one embodiment, the electrically conductive porous structure comprises unit cells having a relative standard deviation of the average unit cell size that may be as little as 5% and in other embodiments as great as 99%. In certain embodiments, the relative standard deviation may be in the range of about 25% to about 75%. By way of further example, in one embodiment the relative standard deviation may be in the range of about 35% to about 75%. By way of further example, in one embodiment, the relative standard deviation may be in the range of about 55% to about 65%. In each of these embodiments, the relative standard deviation may be for a population of unit cells having an average unit cell size in the range of 100 nm to 100 µm, 0.1 µm to 10 µm, 0.2 µm to 2 µm, 0.4 µm to 2 µm or even 0.5 µm to 1.5 µm.

In one embodiment the electrically conductive porous structure comprises unit cells having an average aspect ratio of about 1:1 to about 10:1. By way of further example, in one embodiment the unit cells have an average aspect ratio of about 1:1 to about 5:1. By way of further example, in one embodiment the unit cells have an average aspect ratio of about 1:1 to about 4:1. By way of further example, in one embodiment the unit cells have an average aspect ratio of about 1:1 to about 3:1. By way of further example, in one embodiment the unit cells have an average aspect ratio of about 1:1 to about 2:1. By way of further example, in one embodiment the unit cells have an average aspect ratio of about 1:1 to about 1.5:1. In one such embodiment, the unit cells may have a relative standard deviation of aspect ratio of less than 5%. In another embodiment, the unit cells may have a relative standard deviation of aspect ratio in the range of about 5% to about 99%. For example, in one embodiment the unit cells within a population have a relative standard deviation of aspect ratio in the range of about 25% to about 75%, about 35% to about 75%, or even about 55% to about 65%.

In one embodiment the electrically conductive porous structure comprises interconnectivity windows between the unit cells having an average size that is up to 99% of the average unit cell size. For example, in some embodiments the interconnectivity windows have an average size that is in the range of 20% to 99% of the average the unit cell size. By way of further example, in some embodiments the interconnectivity windows have an average size that is in the range of 30% to 80% of the average unit cell size. By way of further example, in some embodiments the interconnectivity windows have an average size that is in the range of 40% to 70% of the average unit cell size. By way of further example, in some embodiments the interconnectivity windows have an average size that is in the range of 50% to 60% of the average unit cell size. In addition, in each of the foregoing embodiments, the relative standard deviation of the average size of the interconnectivity windows within the porous structure may be less than 5%. In another embodiment, it may be in the range of about 5% to 99%. For example, in each of the foregoing embodiments, the average size of the interconnectivity windows within the porous structure may be in the range of about 25% to 75%, about 35% to about 75%, or even about 55% to about 65%.

In general, however, the shape of the interconnectivity windows between unit cells in the porous structure can be characterized by reference to the aspect ratio thereof. In one embodiment, the interconnectivity windows within a porous structure will have an average aspect ratio of at least about 1:1. For example, in some embodiments the interconnectivity windows within a porous structure have an average aspect ratio of at least about 1.25:1. By way of further example, in some embodiments the interconnectivity windows within a porous structure have an average aspect ratio of at least about 1.5:1. By way of further example, in some embodiments the interconnectivity windows within a porous structure have an average aspect ratio of at least about 2:1. By way of further example, in some embodiments the interconnectivity windows within a porous structure have an average aspect ratio of at least about 3:1. By way of further example, in some embodiments the interconnectivity windows within a porous structure have an average aspect ratio of at least about 4:1. By way of further example, in some embodiments the interconnectivity windows within a porous structure have an average aspect ratio of at least about 5:1. In general, however, the interconnectivity windows within a porous structure will typically have an average aspect ratio of less than about 10:1. Thus, in some embodiments the interconnectivity windows within a porous structure have an average aspect ratio in the range of about 1:1 to about 10:1. By way of further example, in some embodiments the interconnectivity windows within a porous structure have an average aspect ratio in the range of about 1:1 to about 5:1. By way of further example, in some embodiments the interconnectivity windows within a porous structure have an average aspect ratio in the range of about 1:25 to about 3:1. By way of further example, in some embodiments the interconnectivity windows within a porous structure have an average aspect ratio in the range of about 1:25 to about 2:1. In addition, in each of the foregoing embodiments, the relative standard deviation of the aspect ratios of the interconnectivity windows within the porous structure may be less than 5%. Alternatively, it may be in the range of about 5% to 99%. For example, in each of the foregoing embodiments, the relative standard deviation of the aspect ratios of the interconnectivity windows within the porous structure may be in the range of about 25% to 75%, about 35% to about 75%, or even about 55% to about 65%.

In one exemplary embodiment, the working electrode may comprise a network of electrically conductive fibers (see, e.g., FIGS. 1A & 1B) that are in physical contact with one another. The fibrous network can be made by a gas phase deposition technique such as CVD, a spinning technique such as electrospinning. For battery applications the fibers will have a diameter in the range of 10 nm to 100 µm, but will ideally have diameters in the range of 50 nm to 1 µm. The volume density of the fibers is also important for battery applications. The total volume fraction of fibers can be in the range of 0.1% to 50% but will more likely be in the range of 0.5% to 20%. Most often the volume fraction will be in the range of 1% to 10%. The mechanical stability of the fiber network is, at least in part, a function of fiber length. Fiber networks with longer fibers will be more entangled, reducing the probability of fibers escaping from the network. For battery applications, the fibers are preferably at least about 100 nm long but will typically be longer than 1 µm. In most applications, the fibers will be even longer than 10 µm and could be up to millimeters long. The length of individual fibers within the network can vary significantly up to 90%.

In general, electrodeposition is driven by passing a current through the working and counter electrodes. During operation, it can be controlled by either voltage or current. The sign of voltage or current determines the electron injection (reduction) or extraction (oxidation) from the working electrode. In one embodiment, a lithium transition metal oxide is electrodeposited onto a working electrode in an anodic electrodeposition. In another embodiment, a lithium transition metal oxide is electrodeposited onto a working electrode in a cathodic electrodeposition.

In general, precise voltage control requires a reference electrode. In aqueous solutions, Ag/AgCl, Hg/HgO, and saturated calomel electrode are typically used as the reference electrode because of their relative stable potentials. However, there are no standard reference electrodes in molten salt systems and metallic Co, Ni, or Pt are typically used as a pseudo-reference electrode. In one embodiment, when a voltage is applied, it is referred to a reference electrode. Unless otherwise noted herein, the voltage is applied between the working and counter electrodes. When galvanic deposition is used, the absolute current range will typically be in the range of about 1 to about 800 mA/cm$^2$. In one embodiment, a pulsed current waveform is used. For example, in one embodiment a pulsed current waveform is used for electrodeposition onto a porous surface. In other embodiments, a pulsed or constant current waveform is used for electrodeposition onto a flat surface.

Advantageously, the electrodeposition process may be carried out at low pressure thus dispensing with the need for pressure reactors. In general, therefore, the electrodeposition process will typically be carried out at pressures of less than 5 atm. For example, in one embodiment the electrodeposition process will be carried out at pressures of less than 4 atm. By way of further example, in one embodiment the electrodeposition process will be carried out at pressures of less than 3 atm. By way of further example, in one embodiment the electrodeposition process will be carried out at pressures of less than 2 atm. By way of further example, in one embodiment the electrodeposition process will be carried out at pressures of less than 1.5 atm. In certain embodiments, the electrodeposition process will be carried out at ambient (1 atm) pressure.

The bath will typically be at a temperature within the range of about 20° C. to about 1,000° C. for the electrodeposition of the electrochemically active ceramic. In general, however, the quality of the electrochemically active ceramic tends to increase with increasing temperature. Thus, for example, in some embodiments, the electrodeposition temperature will be at least 50° C., 100° C., at least 150° C., at least 200° C. or at least 250° C. provided, however, the electrodeposition bath temperature is maintained above the melting point, and below the decomposition temperature of the electrolyte. In general, temperatures substantially in excess of 750° C., however, are presently less preferred and thus, the operating temperature may be less than 750° C., less than 650° C. or even less than 500° C. In some embodiments, for example, the electrodeposition temperature will be in the range of 50° C. to 750° C., 100° C. to 600° C., 200° C. to 600° C., 200° C. to 500° C., 250° C. to 600° C., or even 300° C. to 500° C. In general, electrodeposition is carried out in a non-aqueous solvent. The solvent may comprise, for example, organic solvents, inorganic solvents, or combination thereof. For example, in one embodiment the non-aqueous solvent comprises an ester, ether, carbonate, aprotic solvent, a molten salt, or a combination thereof. Exemplary esters comprise ethyl acetate, methyl butyrate, and ethyl butyrate. Exemplary ethers include dipropylene glycol dimethyl ether, dimethyl ether, diethyl ether, tetrahydrofuran, and dimethoxyethane. Exemplary carbonates include propylene carbonate, ethylene carbonate, butylene carbonate, dimethyl carbonate, diethyl carbonate, and ethylmethyl carbonate. Exemplary aprotic solvents include dimethyl sulfoxide, and acetonitrile. In each of the foregoing embodiments, if the solvent comprises any water, the amount of water is insufficient to cause the evolution of gas at either of the electrodes as result of the electrolysis of water.

To accommodate elevated temperatures, in certain embodiments electrolyte 400 comprises a molten salt. In general, organic molten salts tend to decompose at temperatures substantially in excess of 200° C. whereas inorganic molten salts typically do not. Accordingly, for electrodeposition temperatures of up to 200° C. the electrolyte may comprise organic molten salt(s), inorganic molten salt(s), or a combination thereof. For electrodeposition temperatures substantially in excess of 200° C., however, the electrolyte will typically predominantly comprise inorganic molten salt(s). In general, therefore, the electrolyte predominantly comprises inorganic molten salt(s) in certain embodiments; stated differently, in such embodiments the majority of the ions comprised by the electrolyte are inorganic ions. By way of further example, in some embodiments at least 60% of the ions comprised by the electrolyte are inorganic ions. By way of further example, in some embodiments at least 70% of the ions comprised by the electrolyte are inorganic ions. By way of further example, in some embodiments at least 80% of the ions comprised by the electrolyte are inorganic ions. By way of further example, in some embodiments at least 80% of the ions comprised by the electrolyte are inorganic ions. By way of further example, in some embodiments at least 90% of the ions comprised by the electrolyte are inorganic ions. By way of further example, in some embodiments at least 95% of the ions comprised by the electrolyte are inorganic ions. By way of further example, in some embodiments at least 99% of the ions comprised by the electrolyte are inorganic ions.

In those embodiments in which electrolyte 400 comprises an inorganic molten salt, the electrolyte salt may comprise a molten hydroxide salt, a molten halide salt, a molten nitrate salt, a molten nitrite salt, a molten sulfate salt, a molten acetate salt, a molten carbonate salt, a molten sulfide salt, a molten silicate, a molten aluminate or a combination thereof. For example, in one such embodiment the molten salt electrolyte comprises a hydroxide salt selected from the group consisting of LiOH, KOH, NaOH, RbOH, CsOH, and combinations thereof. By way of further example, in one such embodiment the molten salt electrolyte comprises a halide salt selected from the group consisting of LiCl, LiF, KF, KCl, NaCl, NaF, LiBr, NaBr, KBr, LiI, NaI, KI, $AlCl_3$, $ZnCl_2$ and combinations thereof. By way of further example, in one such embodiment the molten salt electrolyte comprises a nitrate salt selected from the group consisting of $LiNO_3$, $NaNO_3$, $KNO_3$, and combinations thereof. By way of further example, in one such embodiment the molten salt electrolyte comprises a nitrite salt selected from the group consisting of $LiNO_2$, $NaNO_2$, $KNO_2$, and combinations thereof. By way of further example, in one such embodiment the molten salt electrolyte comprises a sulfate salt selected from the group consisting of $Li_2SO_4$, $Na_2SO_4$, $K_2SO_4$, and combinations thereof. By way of further example, in one such embodiment the molten salt comprises a molten salt selected from the group consisting of LiOH, KOH, NaOH, RbOH, CsOH, LiCl, LiF, KF, KCl, NaCl, NaF, LiBr, NaBr, KBr, LiI, NaI, KI, $AlCl_3$, $LiNO_3$, $NaNO_3$, $KNO_3$, $LiNO_2$, $NaNO_2$, $KNO_2$, $Li_2SO_4$, $Na_2SO_4$, $K_2SO_4$, and combinations thereof in hydrated or non-hydrated forms. In certain embodiments, for example, the hydrated form of the salt may melt at significantly lower temperatures.

In those embodiments in which the electrolyte comprises an organic molten salt, the electrolyte salt may comprise only organic ions or a mixture of organic ions and inorganic ions. In general, organic molten salts selected for the electrolyte will solvate the transition metal oxide precursor, be electrochemically stable at voltages required to achieve the electrodeposition, and be ionically conducting. In certain embodiments, the organic molten salts will be thermally stable up to at least 200° C., at 300° C. and, in some embodiments, up to 400° C. Exemplary organic cations include quaternary ammonium salts, imidazolium salts, pyrrolidinium salts, pyridinium salts, phosphonium salts, and sulfonium salts. Exemplary organic anions include borates, phosphates, sulfonates, alkylsulfates, imides, and amides. In each of the foregoing embodiments, the salt may comprise an inorganic counterion to the cationic or anionic organic ion.

In general, the bath is prepared by heating the organic and/or inorganic salts above their melting point and dissolving the transition metal and lithium source(s) in the molten salt electrolyte. For inorganic salts, the melting temperature will typically be in the range of 100° C. to about 400° C., and in some embodiments the melting temperature will be in the range of about 200° C. to about 400° C., but some may have melting temperatures of as much as 600° C. For organic salts, the melting temperature will generally be less, e.g., room temperature (−25° C. to 100° C.).

Referring again to FIG. 2, electrolyte 400 contains a source of lithium for the lithium transition metal oxide. In those embodiments in which the molten salt is a lithium containing molten salt such as LiOH, LiF, LiCl, LiBr, LiI, $LiNO_3$, $LiNO_2$, or $Li_2SO_4$, the molten salt may, itself, be a lithium source. In other embodiments, the lithium source for the lithium transition metal oxide may be a lithium oxide or lithium metal.

In addition to one or more molten salts, the electrolyte additionally includes a source of a transition metal for the lithiated transition metal oxide. The transition metal specie(s) will depend, at least in part, upon whether the lithium transition metal oxide product is intended to be an anodically active material or a cathodically active material. The average potential of a material as measured vs. lithium determines whether it functions as an anode or cathode for a lithium ion battery. In general, a material having a potential of less than about 2.5V (vs Li/Li$^+$) is typically considered an anode whereas a material having a potential of greater than about 2.5V (vs Li/Li$^+$) is typically considered a cathode.

In one embodiment, the electrochemically active material is an anodically active material such as lithium titanate. In such embodiments, the titanium source may be titanium tetrachloride, titanium trichloride, titanium dichloride, titanium trifluoride, titanium tetrafluoride, titanium tetrabromide, titanium tribromide titanium tetraiodide, titanium hydride, or titanium oxide. Titanium alkoxides are also suitable including titanium isopropoxide, titanium ethoxide, and titanium butoxide.

In other embodiments, the electrochemically active material is a cathodically active material such as an optionally doped lithiated transition metal oxide wherein the transition metal is a transition metal selected from Period 4, 5, or 6 (i.e., the fourth, fifth or sixth row of the Periodic Table) and combinations thereof (i.e., mixed lithiated transition metal oxides). For example, in one embodiment the electrodeposited lithiated transition metal oxide has the formula $Li_xM_yO_n$ where M is a Period 4, 5 or 6 transition metal (or combination thereof), x is greater than 0 and less than about 1.2, y is about 0.5 to about 1, n is about 1.5 to about 2.5, and the ratio (2n-x)/y ranges from about 2.5 to about 3.7. In one such embodiment, M comprises one or more metals selected from the group consisting of Ti, V, Cr, Mn, Co, Ni, Mo, W, Zr, Mg, Al, Cu, Fe, and Zn. Exemplary electrodeposited lithiated transition metal oxides include $LiCoO_2$, $LiMnO_2$, and $LiNi_aMn_bCo_{1-a-b}O_2$ (where a is greater than 0 and less than about 1, b is greater than 0 and less than about 1, and a+b is greater than 0 and less than about 1).

The transition metal source material for the transition metal oxides may be any of a range of nitrates, nitrites, sulfates, halides, hydroxides, oxides, alkoxides and acetates of the transition metal that is compatible with electrodeposition methods described herein. For example, in one embodiment the transition metal is cobalt and the cobalt source material is CoO, $Co_2O_3$, $Co(OH)_2$, $Co_3O_4$, $CoCl_2$, $CoSO_4$, or $Co(NO_3)_2$, $Co(NO_2)_2$, $Co(C_2H_3O_2)_2$. By way of further example, in one embodiment the transition metal is manganese and the source material is $MnCl_2$, $MnSO_4$, $Mn(CH\square COO)\square$, $Mn(NO\square)\square$, $Mn(NO_2)_2$. In each of these embodiments, the transition metal source material may be a hydrate or anhydrate.

In some embodiments, the lithiated transition metal oxide may be doped with a non-transition metal such as magnesium, aluminum, silicon, or fluorine. In such embodiments, the lithiated transition metal oxide may have the chemical formula is $Li_xM_{1-y}A_yO_{2-z}F_z$. M is transition metal, A is the dopant metal (e.g., Mg, Si, or Al) where x ranges from greater than 0 to 1, and y and z range from 0 to 0.2.

The oxidation state of the transition metal in the deposited transition metal oxide is related to the voltage profile in the lithium ion batteries with the lithium transition metal oxide as the cathode. The cathode materials deposited by the disclosure usually show the oxidation state around 2.5-3.7. In one embodiment, this oxidation state is achieved by either of two methods. In one, a low-valence transition metal ions in plating bath is oxidized by applying positive voltage in the range of 0.4~1.7V (vs a pseudo-reference electrode). For example, in one embodiment divalent cobalt salt is dissolved in a melt of LiOH and KOH and 1.2V is applied (vs cobalt foil) to obtain $LiCoO_2$. In the other method, high-valence transition metal ions in the bath are reduced by applying negative voltage in the range of 0~-1.7V (vs a pseudo-reference electrode). For example, in one embodiment potassium permanganate is dissolved in a melt of LiOH and KOH and -1.5V (vs Pt wire) is applied to deposit lithium manganese oxide. In each of these embodiments, a pulsed voltage waveform may be used for electrodeposition onto porous structures.

In one embodiment, the electrodeposited material is a lithiated cobalt oxide composition comprising a metastable O2 phase. This O2 phase is capable of being converted to the O3 phase upon annealing at a temperature in the range of about 300 to 400° C.

In one exemplary embodiment, the transition metal oxide deposited is a layered structure, $LiCoO_2$, which is characterized by having an O3 phase mixed with a small amount of O2 phase. Both phases are characterized by nano electron beam diffraction patterns with trigonal symmetry, with diffraction spots for O2 located at 0.4 1/Å and O3 at 0.7 1/Å.

In one embodiment, the electrodeposited lithiated transition metal oxide, e.g., lithiated manganese oxide in the as-deposited state, is not electrochemically active. In such embodiments, the lithiated transition metal oxide, e.g., lithiated manganese oxide, may be annealed (e.g., in air) to convert the electrodeposited transition metal oxide to the desired spinel phase.

In certain embodiments, the electrodeposited lithiated transition metal oxide material will be separated from the working electrode upon completion of the electrodeposition step. For example, the electrodeposited lithiated transition metal oxide material may simply be scraped from the working electrode. In such embodiments, the working electrode may have any of a wide range of shapes and compositions that facilitate the electrodeposition of the desired lithium transition metal oxide material. Upon separation, the lithium transition metal oxide may thereafter be combined with a conductive material (e.g., carbon) and a binder (e.g., polyvinylidene fluoride) to form a mixture that is applied to a current collector substrate for incorporation into a battery. In one such embodiment, the lithium transition metal oxide is optionally thermally annealed (e.g., at a temperature of at least about 700° C.) to improve the crystal structure or one or more other characteristics of the lithium transition metal oxide material before it is incorporated into another structure such as a battery.

In one embodiment, the working electrode is of a size, shape and composition that is adapted for use as a current collector in an energy storage device. Advantageously, therefore, a composite of the lithiated transition metal oxide composition produced in the electrodeposition process need not be separated from the working electrode onto which it was deposited. Instead, the combination (composite) of the working electrode having a conformal layer of lithiated transition metal oxide (and without any further chemical processing of the lithiated transition metal oxide material) may be directly employed as an electrode in an energy storage device such as a secondary battery. In such embodiments, it is generally preferred that the composite not be subjected to any high temperature annealing steps that would cause significant diffusion of material from the working electrode into the lithiated transition metal oxide or degradation of the crystal structure of the lithiated transition metal oxide material. For example, in some embodiments it is preferred that the electrodeposited lithiated transition metal oxide/working electrode composite not be annealed at temperatures in excess of about 700° C.

In those embodiments in which an electrochemically active battery material is deposited on a working electrode and the combination is intended for use as an electrode in a battery, it is generally preferred that the deposited layer conformally coat a substantial fraction of the working electrode. For example, in some embodiments the entire working electrode may not be immersed in the electrolyte or a portion of the working electrode may be masked; as a result, in such embodiments less than the entire working electrode is coated. In general, however, at least about 90% of the available surface (external and internal) of the working electrode is covered. By way of further example, in some embodiments at least 95% of the surface of the working electrode is covered. By way of further example, in some embodiments at least 98% of the surface of the working electrode is covered. By way of further example, in some embodiments at least 99% of the surface of the working electrode is covered.

Additionally, the thickness of the deposited coating may vary somewhat within the three-dimensional working electrode but in some embodiments it is generally preferred that the thickness variation not be too substantial. For example, in some embodiments the thickness of the coating at any given area within the working electrode (measured in a direction that is perpendicular to the interface between the coating and the surface of the working electrode to the terminal edge of the coating) will be in the range of about 1 nm to about 50 μm. Typically, the thickness will be in the range of about 100 nm to about 10 μm. In addition, the thickness of the coating will typically have a variation of no more than 50% of the average thickness value. For example, in some applications the thickness variation will be less than 20% of the average thickness. By way of further example, in some applications the thickness variation will be less than 10% of the average thickness.

In one exemplary embodiment, a high quality $LiCoO_2$ or a doped $LiCoO_2$ material may be produced in scalable and large quantity by the electrodeposition method of the present disclosure. In this embodiment, $LiCoO_2$ is conformally coated onto a 3D conductive scaffold or planar surface to form a Li-ion battery electrode. Hydroxyl groups can coordinate the divalent cobalt ions to $Co(OH)_6^{4-}$ complex. Due to the relatively high solvation capability for cobalt salts, hydroxides are generally preferred in some embodiments as the molten salt electrolyte species. To form the melt, a salt is ground and placed in a crucible such as a nickel crucible along and a cobalt source such as $CoO$, $Co_2O_3$, $Co(OH)_2$, $Co_3O_4$, $CoCl_2$, $CoSO_4$, $Co(NO_3)_2$ is added to the crucible after melting. In one such embodiment, another metal ion is introduced into the $LiCoO_2$ structure. For example, in one such embodiment $Al_2O_3$ nanoparticles may be dissolved into the molten salt and Al ions are then co-deposited into the transition metal layer of $LiCoO_2$ and substitute for Co ions in the crystal lattice. Additionally, or alternatively, addition of $MnCl_2$ or $NiCl_2$ (or other manganese or nickel salts) would dope the resulting ceramic with Mn and/or Ni ions.

In each of the foregoing exemplary embodiments, the lithiated transition metal oxide ceramic (e.g., $LiCoO_2$) may be electrodeposited onto a porous fiber mat working electrode possessing non-line-of-site curvature in the thickness direction. In such embodiments, an electrolyte and lithium and transition metal source materials may be charged to a crucible (e.g., nickel or $Al_2O_3$ crucible) and heated to a temperature of at least about ~325° C. After the charge is fully melted, the working electrode (i.e., the fiber mat), a pseudo-reference electrode (e.g., a cobalt rod), and nickel foil as the counter electrode are inserted into the molten system. If alumina crucible is used, another piece of conductive substrate (Ni, Co, Pt, Cu foil, or carbon) must be used as the counter electrode. An intermittent voltage pulse (e.g., 0.5~2 V for 0.1 sec to ~3 min each) is applied between the working and reference electrodes. After coating the lithiated transition metal oxide material/fiber mat composite is removed from the bath, rinsed to remove residual salt, and annealed at 150° C. overnight in a vacuum chamber.

The electrochemical deposition on the inner, non-line-of-site surfaces of the working electrode may be controlled, in part, by the transition metal ion diffusion. In general, a non-uniform ion gradient leads to the overgrowth on the external surface of scaffold but less coating inside. To allow ion diffusion, an open circuit voltage (OCV) period is applied between pulses. During such periods, no current is applied but the potential monitored. The total number of pulses is used to control the coating thickness or overall loading of the transition metal oxide (e.g., $LiCoO_2$).

In some embodiments, the electrodeposition step is repeated. For example, in one embodiment a first layer is electrochemically deposited onto the working in a first electrodeposition and a second layer is electrochemically deposited on the first layer. For example, in one such embodiment, at least one of the two electrodeposition steps is carried out in a molten salt electrolyte as described herein. By way of further example, in one such embodiment each of the two electrodeposition steps is carried out in a molten salt electrolyte. In each of the foregoing embodiments, the same lithiated transition metal oxide may be deposited in the first and second step, or different materials may be deposited in the first and second steps. Additionally, the relative proportions of the two layers may vary widely, e.g., from 90:10 wt % (first layer to second layer) to 10:90 wt % (first layer to second layer). For example, in one embodiment the first layer (i.e., the layer between the second layer and the working electrode) may comprise lithiated manganese oxide or another high capacity electrochemically active material such as a lithium-rich mixed transition metal oxide and the second layer (i.e., the layer separated from the working electrode by the first layer) may comprise lithiated cobalt oxide or another electrochemically active material such as lithiated nickel/cobalt oxides.

The resulting composite (working electrode+electrodeposited layer(s)) may have a range of thicknesses. For example, in some embodiments, the composite has a thickness of at least 1 μm. By way of further example, in some embodiments the composite has a thickness of at least 10 μm. By way of further example, in some embodiments the composite has a thickness of at least 50 μm. By way of further example, in some embodiments the composite has a thickness of at least 100 μm. By way of further example, in some embodiments the composite has a thickness of at least 200 μm. By way of further example, in some embodiments the composite has a thickness of at least 500 μm. By way of further example, in some embodiments the composite has a thickness of at least 750 μm. By way of further example, in some embodiments the composite has a thickness of at least 1 mm. By way of further example, in some embodiments the composite has a thickness of at least 2 mm. By way of further example, in some embodiments the composite has a thickness of at least 3 mm. By way of further example, in some embodiments the composite has a thickness of at least 4 mm. By way of further example, in some embodiments the composite has a thickness of at least 5 mm. In some embodiments, the length and width of the composite may be microscopic (e.g., 500 μm or less). In one embodiment, in each of the foregoing exemplary embodiments, the thickness dimension is the smallest dimension of the composite.

For some end use applications, it may be advantageous that the deposited coating/working electrode composite be relatively flexible. For example, some primary and secondary battery applications would benefit from a flexible anode, cathode or even a flexible battery. Advantageously, the process of the present disclosure may be used to prepare such flexible materials. For example, in one embodiment, the working electrode/deposited coating composite has a flexibility characterized by an electrochemical capacity retention of at least 80% even after repeated bending of the composite to a radius of curvature of 100 mm, 75 mm, 50 mm, 25 mm, 10 mm, or even 7 mm over at least 300 bending cycles (i.e., each cycle involving a bending step and then returning the bent composite to its original shape), at least 500 bending cycles, at least 1,000 bending cycles, at least 2,000 bending cycles, or even at least 3,000 bending cycles. For example, in one embodiment the working electrode/deposited coating composite has a flexibility characterized by an electrochemical capacity retention of at least 80% even after bending the composite to a radius of curvature of 25 mm over at least 300 bending cycles, at least 500 bending cycles, at least 1,000 bending cycles, at least 2,000 bending cycles, or even at least 3,000 bending cycles. By way of further example, in one such embodiment the working electrode/deposited coating composite has a flexibility characterized by an electrochemical capacity retention of at least 80% even after bending the composite to a radius of curvature of 10 mm over at least 300 bending cycles, at least 500 bending cycles, at least 1,000 bending cycles, at least 2,000 bending cycles, or even at least 3,000 bending cycles. By way of further example, in one such embodiment the working electrode/deposited coating composite has a flexibility characterized by an electrochemical capacity retention of at least 80% even after bending the composite to a radius of curvature of 7 mm over at least 300 bending cycles, at least 500 bending cycles, at least 1,000 bending cycles, at least 2,000 bending cycles, or even at least 3,000 bending cycles.

In one embodiment, a secondary battery comprises a lithiated transition metal oxide ceramic as described herein as an electrode. In this embodiment, the electrode (anode or cathode) comprising the lithiated transition metal oxide is assembled in a battery along with a counter-electrode (the counter-electrode being anodic if the lithium transition metal oxide is cathodic or cathodic if the lithium transition metal oxide is anodic), an electrolyte, current collectors and electrical connections for electrically connecting the electrode electrochemical stacks to an external energy supply or consumer. For lithium ion batteries for portable electronics such as mobile phones and computers, for example, the battery enclosure may be a pouch or other conventional battery enclosure.

Figure 16A:
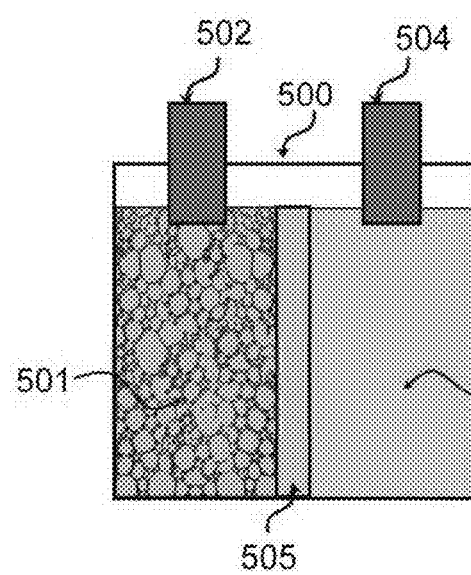
FIG. 16(a) is a schematic drawing of a battery in accordance with one alternative embodiment of the present disclosure, illustrating a packed pouch cell with cathode and anode tabs.

Referring now to FIG. 16a, a battery typically comprises an anode 503, cathode 501, separator 505, electrolyte (not shown), tabs 502 and 504, and package 500. In accordance with present disclosure, the anode, the cathode or both the anode and the cathode comprise a lithium transition metal oxide composition prepared as described herein. In one embodiment, one of the electrodes (the anode or the cathode) comprises a lithium transition metal oxide composition prepared as described herein and the other electrode (i.e., the counter-electrode) is prepared using any currently available techniques. In another embodiment, each of the electrodes (the anode and the cathode) comprises a lithium transition metal oxide composition prepared as described herein.

Separator/solid polymer electrolyte 505 between the cathode 501 and the anode 503 serves as a physical barrier between the two electrodes so that neither electrode is electronically connected within the cell. Separator/solid polymer electrolyte 505 may comprise any of the materials conventionally used as secondary battery separators including, for example, microporous polyethylenes, polypropylenes, $TiO_2$, $SiO_2$, $Al_2O_3$, and the like (P. Arora and J. Zhang, "Battery Separators" Chemical Reviews 2004, 104, 4419-4462). Alternatively, separator/solid polymer electrolyte 505 may comprise a conventional solid polymer electrolyte. A gelled electrolyte (mixture of liquid and solid) may also be provided. In any of the foregoing embodiments, separator/solid polymer electrolyte 505 comprises an electrolyte with a lithium or other carrier ion.

Tabs 502, 504 may comprise any of a range of electrically conductive materials that are chemically compatible for connection to a battery cathode or anode, respectively. For example, tab 502 may comprise aluminum and tab 504 may comprise copper or nickel. In those embodiments in which the electrode (anode or cathode) comprises a monolithic porous open-cell structure of the present disclosure, the tab is attached to the porous open-cell structure before the battery active material is deposited onto the structure. The tab may be connected to the porous structure using a welding technique such as spot welding or ultra-sonic welding and then sealed inside the packaging 500.

Figure 16B:
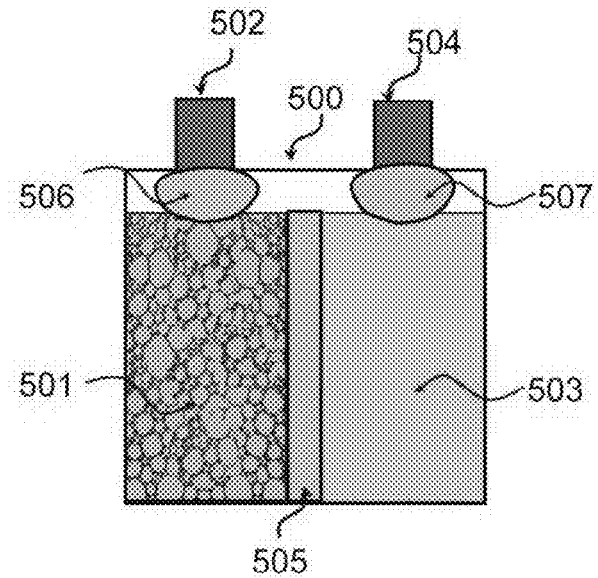
FIG. 16(b) is a schematic drawing of a battery in accordance with one alternative embodiment of the present disclosure, illustrating a polymer deposited in the range of tabs to prevent electrolyte from corroding tabs.
Figure 16C:
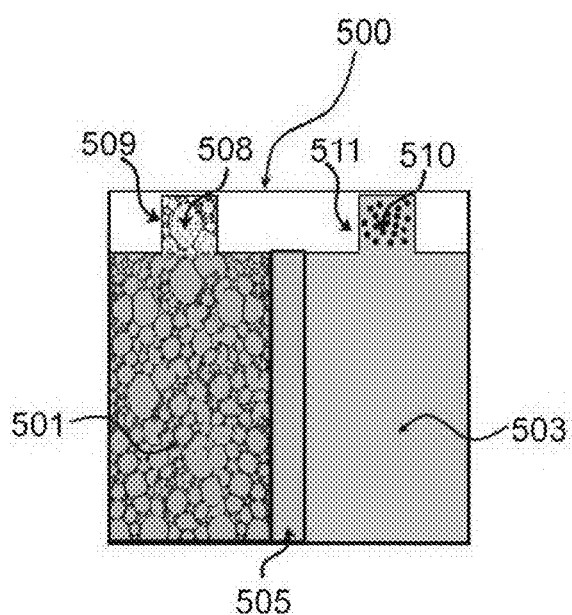
FIG. 16(c) is a schematic drawing of a battery in accordance with one alternative embodiment of the present disclosure, illustrating the use of fillers to enhance the scaffolded electrodes and tabs.

In certain embodiments in which the battery comprises a liquid, non-aqueous electrolyte, and the tab is attached to a metal comprised by the electrode that differs from the metal comprised by the tab, it may be desirable to electrically isolate the tab from the electrolyte to inhibit potential long-term galvanic corrosion. One method to isolate the tab from the electrolyte involves encapsulating the region where the tab and electrolyte are in physical contact (regions 506 and 507 in FIG. 16b) with an inert, stable, polymer such as polyester, polyethylene. To increase the contact area between the electrode and the tab, it may be desirable to infill the porous open cell structure with conductive materials (508 and 510), only in the regions (509 and 511) of the tabs in FIG. 16c. The regions 509 and 511 in FIG. 16c were welded with the Tab 502 and 504. The conductive filler materials 508 and 510 need not be the same material as the tabs or the same material as the porous open cell structure. This conductive filler materials 508 and 510 can be deposited by processes such as chemical vapor deposition, atomic layer deposition, physical vapor deposition, electrodeposition, electroless deposition, nanoparticle infilling, dip coating, or sol gel deposition. If any of the three conductive materials are different, the tabbing region (506 and 507) must be isolated from the liquid electrolyte to prevent galvanic corrosion. The packaging would then be sealed around the tab and the protruding region of the tab would be used to connect to an electronic circuit.

Figure 16D:
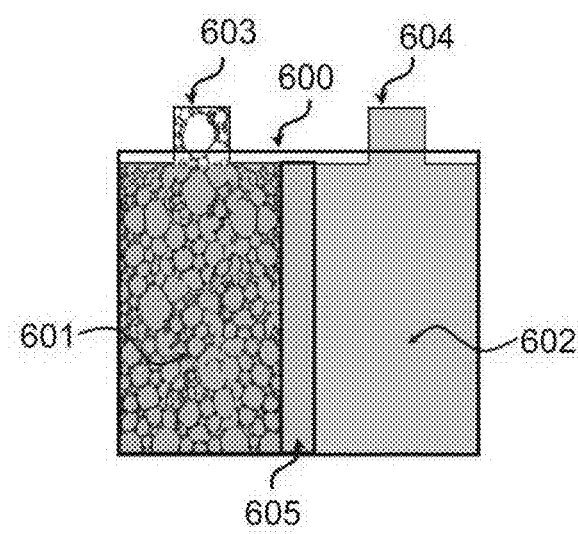
FIG. 16(d) is a schematic drawing of a battery in accordance with one alternative embodiment of the present disclosure, illustrating self-extruded tabs in scaffolded electrodes.

Alternatively, and referring now to FIG. 16d in one embodiment a battery comprising a cathode 601, an anode 602, and separator/solid polymer electrolyte 605 (as described in connection with FIG. 16) may be assembled without a tab formed from a dissimilar material. In this embodiment, a small region (603 or 604) of the electrode (cathode 601 or anode 602) extends out of the battery package (600). The region protruding from the packaging, however, would not be coated with active material (anodically active material or cathodically active material). This non-coated region can be accomplished by a number of methods including, for example: (1) masking this region during the active material deposition, or (2) selectively removing active material from this region. The packaging would seal around the porous open cell structure, however, the open cell structure would not be sealed. Thus, an inert, stable polymer has to be in filled into the porous open cell structure to complete the seal. The polymer infilling can occur before, after or during sealing around the structure. In this embodiment, a conductive filler can be added to the protruding region to help stabilize the region. The electronic circuit can be directly connected to the protruding region.

Alternatively, if the particle template for the fabrication of monolithic, highly porous, open cell structures, comprises the desired material for the tab, then the template may not be removed in a small region to serve as a tab for the electrode. For example, if copper is used as a template and nickel is coated within the void space of the copper template, then the copper could be etched away from the highly porous open cell nickel structure in all areas except a small region, probably at the edge or corner of the electrode. This region would then consist of copper surrounded by nickel whereas the rest of the electrode would comprise the highly porous open cell nickel structure.

The present disclosure further includes the following enumerated embodiments.

Embodiment 1

A method of forming a lithiated transition metal oxide comprising the steps of: immersing a working electrode into a molten salt electrolyte comprising a lithium source and a transition metal source, electrodepositing a lithiated transition metal oxide onto a surface of the working electrode from the electrolyte at a temperature in excess of the melting temperature of the molten salt electrolyte, removing the working electrode from the bath and rinsing the electrodeposited lithiated transition metal oxide.

Embodiment 2

The method of embodiment 1 wherein the molten salt electrolyte comprises an organic molten salt, an inorganic molten salt, or a combination thereof.

Embodiment 3

The method of claim 1 or 2 wherein the majority of the ions comprised by the molten salt electrolyte are inorganic ions.

Embodiment 4

The method of embodiment 1 or 2 wherein at least 60% of the ions comprised by the molten salt electrolyte are inorganic ions.

Embodiment 5

The method of embodiment 1 or 2 wherein at least 70% of the ions comprised by the molten salt electrolyte are inorganic ions.

Embodiment 6

The method of embodiment 1 or 2 wherein at least 80% of the ions comprised by the molten salt electrolyte are inorganic ions.

Embodiment 7

The method of embodiment 1 or 2 wherein at least 90% of the ions comprised by the molten salt electrolyte are inorganic ions.

Embodiment 9

The method of embodiment 1 or 2 wherein at least 95% of the ions comprised by the molten salt electrolyte are inorganic ions.

Embodiment 10

The method of embodiment 1 or 2 wherein at least 99% of the ions comprised by the molten salt electrolyte are inorganic ions.

Embodiment 11

The method of any of the preceding embodiments wherein the molten salt electrolyte comprises a molten hydroxide salt, a molten halide salt, a molten nitrate salt, a molten nitrite salt, a molten sulfate salt or a combination thereof.

Embodiment 12

The method of any of the preceding enumerated embodiments wherein the molten salt electrolyte comprises a hydroxide salt selected from the group consisting of LiOH, KOH, NaOH, RbOH, CsOH, and combinations thereof.

Embodiment 13

The method of any of the preceding enumerated embodiments wherein the molten salt electrolyte comprises a halide salt selected from the group consisting of LiCl, LiF, KF, KCl, NaCl, NaF, LiBr, NaBr, KBr, LiI, NaI, KI, $AlCl_3$, and combinations thereof.

Embodiment 14

The method of any of the preceding enumerated embodiments wherein the molten salt electrolyte comprises a nitrate salt selected from the group consisting of $LiNO_3$, $NaNO_3$, $KNO_3$, and combinations thereof.

Embodiment 15

The method of any of the preceding enumerated embodiments wherein the molten salt electrolyte comprises a nitrite salt selected from the group consisting of $LiNO_2$, $NaNO_2$, $KNO_2$, and combinations thereof.

Embodiment 16

The method of any of the preceding enumerated embodiments wherein the molten salt electrolyte comprises a sulfate salt selected from the group consisting of $Li_2SO_4$, $Na_2SO_4$, $K_2SO_4$, and combinations thereof.

Embodiment 17

The method of any of the preceding enumerated embodiments wherein the molten salt electrolyte comprises a molten salt selected from the group consisting of LiOH, KOH, NaOH, RbOH, CsOH, LiCl, LiF, KF, KCl, NaCl, NaF, LiBr, NaBr, KBr, LiI, NaI, KI, $AlCl_3$, $LiNO_3$, $NaNO_3$, $KNO_3$, $LiNO_2$, $NaNO_2$, $KNO_2$, $Li_2SO_4$, $Na_2SO_4$, $K_2SO_4$, and combinations thereof.

Embodiment 18

The method of any of the preceding enumerated embodiments wherein the working electrode is selected from the group consisting of metals, metal alloys, ceramics, carbon (including all of the allotropes thereof), electrically conductive polymers, and electrically conductive composite materials.

Embodiment 19

The method of any of embodiments 1-18 wherein the working electrode is selected from the group consisting of metals, metal alloys, ceramics, carbon (including all of the allotropes thereof), electrically conductive polymers, and electrically conductive composite materials.

Embodiment 20

The method of any of embodiments 1-18 wherein the working electrode is selected from the group consisting of aluminum, copper, chromium, cobalt, manganese, nickel, silver, gold, tin, platinum, palladium, zinc, tungsten, tantalum, rhodium, molybdenum, titanium, iron, zirconium, vanadium, and hafnium, and the alloys thereof.

Embodiment 21

The method of any of embodiments 1-18 wherein the working electrode is selected from the group consisting of borides, carbide, and silicides.

Embodiment 22

The method of any of embodiments 1-18 wherein the working electrode is selected from the group consisting of titanium boride, harfnium boride, magnesium boride, chromium boride, vanadium boride, aluminum boride, tungsten carbide, titanium carbide, chromium carbide, molybdenum carbide, hafnium carbide, tantalum carbide, vanadium carbide, tungsten silicide, titanium silicide, vanadium silicide, nickel silicide, platinum silicide, chromium silicide, copper silicide, and zirconium silicide.

Embodiment 23

The method of any of embodiments 1-18 wherein the working electrode is selected from the group consisting of indium tin oxide and fluorinated tin oxide.

Embodiment 24

The method of any of embodiments 1-18 wherein the working electrode is selected from the group consisting of conductive carbon particles, carbon nanotubes, carbon fibers, fullerenes, graphene, graphite, and glassy carbon.

Embodiment 25

The method of any of embodiments 1-18 wherein the working electrode comprises polyanaline.

Embodiment 26

The method of any of embodiments 1-18 wherein the working electrode comprise a composite containing conductive filler such as conductive particles, fibers, or sheets.

Embodiment 27

The method of any of the preceding enumerated embodiments wherein the working electrode is substantially planar.

Embodiment 28

The method of any of embodiments 1-26 wherein the working electrode is a sheet or foil.

Embodiment 29

The method of any of embodiments 1-26 wherein the working electrode is a three dimensional working electrode.

Embodiment 30

The method of any of embodiments 1-26 wherein the lithiated transition metal oxide ceramic is electrodeposited onto the surface(s) of a three-dimensional working electrode having a regular geometric.

Embodiment 31

The method of any of embodiments 1-26 wherein the lithiated transition metal oxide ceramic is electrodeposited onto the surface(s) of a three-dimensional working electrode having a prismatic, cuboidal, pyramidal, truncated pyramidal, conical, truncated conical, cylindrical, domed cylindrical, truncated cylindrical, barrel, or spherical shaped three-dimensional structure.

Embodiment 32

The method of any of embodiments 1-26 wherein the lithiated transition metal oxide ceramic is electrodeposited onto the surface(s) of a three-dimensional working electrode having an irregular shape.

Embodiment 34

The method of any of embodiments 1-26 wherein the lithiated transition metal oxide ceramic is electrodeposited onto the surface(s) of a three-dimensional working electrode having an open pore porous structure.

Embodiment 35

The method of any of the preceding enumerated embodiments wherein the working electrode has a void volume fraction (porosity) of at least about 25%.

Embodiment 36

The method of any of the preceding enumerated embodiments wherein the working electrode has a void volume fraction (porosity) of at least about 35%.

Embodiment 37

The method of any of the preceding enumerated embodiments wherein the working electrode has a void volume fraction (porosity) of at least about 50%.

Embodiment 38

The method of any of the preceding enumerated embodiments wherein the working electrode has a void volume fraction (porosity) of at least about 60%.

Embodiment 39

The method of any of the preceding enumerated embodiments wherein the working electrode has a void volume fraction (porosity) of at least about 75%.

Embodiment 40

The method of any of the preceding enumerated embodiments wherein the working electrode has a void volume fraction (porosity) of at least about 90%.

Embodiment 41

The method of any of the preceding enumerated embodiments wherein the working electrode has a void volume fraction (porosity) of at least about 95%.

Embodiment 42

The method of any of the preceding enumerated embodiments wherein the working electrode has a void volume fraction (porosity) of at least about 99%.

Embodiment 43

The method of any of the preceding enumerated embodiments wherein the working electrode is an electrically conductive porous structure comprising unit cells having an average size in the range of about 10 nm to about 100 µm.

Embodiment 44

The method of any of the preceding enumerated embodiments wherein the working electrode is an electrically conductive porous structure comprising unit cells having an average size in the range of about 10 nm to 50 µm.

Embodiment 45

The method of any of the preceding enumerated embodiments wherein the working electrode is an electrically conductive porous structure comprising unit cells having an average size in the range of about 10 nm to about 25 µm.

Embodiment 46

The method of any of the preceding enumerated embodiments wherein the working electrode is an electrically conductive porous structure comprising unit cells having an average size in the range of about 10 nm to about 10 µm.

Embodiment 47

The method of any of the preceding enumerated embodiments wherein the working electrode is an electrically conductive porous structure comprising unit cells having an average size in the range of about 100 nm to about 10 µm.

Embodiment 48

The method of any of the preceding enumerated embodiments wherein the working electrode is an electrically conductive porous structure comprising unit cells having an average size in the range of about 100 nm to about 5 µm.

Embodiment 49

The method of any of the preceding enumerated embodiments wherein the working electrode is an electrically conductive porous structure comprising unit cells having an average size in the range of about 0.2 µm to about 2 µm.

Embodiment 50

The method of any of the preceding enumerated embodiments wherein the working electrode is an electrically conductive porous structure comprising unit cells having an average size in the range of about 0.4 µm to about 2 µm.

Embodiment 51

The method of any of the preceding enumerated embodiments wherein the working electrode is an electrically conductive porous structure comprising unit cells having an average size in the range of about 0.5 µm to about 1.5 µm.

Embodiment 52

The method of any preceding enumerated embodiment wherein the working electrode has a thickness of at least 1 µM.

Embodiment 122

The method of any preceding enumerated embodiment wherein the working electrode has a thickness of at least 10 µM.

Embodiment 123

The method of any preceding enumerated embodiment wherein the working electrode has a thickness of at least 50 µM.

Embodiment 124

The method of any preceding enumerated embodiment wherein the working electrode has a thickness of at least 100 µM.

Embodiment 125

The method of any preceding enumerated embodiment wherein the working electrode has a thickness of at least 200 µM.

Embodiment 126

The method of any preceding enumerated embodiment wherein the working electrode has a thickness of at least 500 µM.

Embodiment 127

The method of any preceding enumerated embodiment wherein the working electrode has a thickness of at least 750 µM.

Embodiment 128

The method of any preceding enumerated embodiment wherein the working electrode has a thickness of at least 1 mm.

Embodiment 129

The method of any preceding enumerated embodiment wherein the working electrode has a thickness of at least 2 mm.

Embodiment 130

The method of any preceding enumerated embodiment wherein the working electrode has a thickness of at least 3 mm.

Embodiment 131

The method of any preceding enumerated embodiment wherein the working electrode has a thickness of at least 4 mm.

Embodiment 131

The method of any preceding enumerated embodiment wherein the working electrode has a thickness of at least 5 mm.

Embodiment 132

The method of any preceding enumerated embodiment wherein the working electrode comprises unit cells having an average size in the range of about 10 nm to about 100 µm.

Embodiment 133

The method of any of the preceding enumerated embodiments wherein the lithiated transition metal oxide is conformally coated onto the working electrode.

Embodiment 134

The method of any of the preceding enumerated embodiments wherein the transition metal source in the plating bath comprises at least one of aluminum ($Al_2O_3$, $AlCl_3$) and transition metal (TM) compounds (TM oxides, TM chrolides, TM sulfates).

Embodiment 135

The method of any preceding enumerated embodiment wherein electrodeposition is carried out at a temperature in the range of about 200 to about 600° C.

Embodiment 136

The method of any preceding enumerated embodiment wherein electrodeposition is carried out at a temperature in the range of about 300 to about 500° C.

Embodiment 137

The method of any preceding enumerated embodiment wherein electrodeposition is carried out at a temperature in the range of about 300 to about 400° C.

Embodiment 138

The method of any preceding enumerated embodiment wherein electrodeposition is carried out at a pressure of less than 2 atmospheres.

Embodiment 139

The method of any preceding enumerated embodiment wherein electrodeposition is carried out at atmospheric pressure.

Embodiment 140

The method of any preceding enumerated embodiment wherein the thickness of the electrodeposited lithiated transition metal oxide ranges from 10 nm to 100 µm.

Embodiment 141

The method of any preceding enumerated embodiment wherein the electrodeposited lithiated transition metal oxide is lithium cobalt oxide characterized by a Raman spectrum containing a peak at approximately 680 $cm^{-1}$.

Embodiment 142

A primary or secondary battery comprising a lithiated transition metal oxide prepared by a method of any of the preceding enumerated embodiments.

Embodiment 201

A method of forming a lithiated transition metal oxide comprising the steps of: immersing a working electrode into a non-aqueous electrolyte comprising a lithium source and a transition metal source, electrodepositing a lithiated transition metal oxide onto a surface of the working electrode from the electrolyte at a temperature in excess of the melting temperature of the non-aqueous electrolyte, removing the working electrode from the bath and rinsing the electrodeposited lithiated transition metal oxide.

Embodiment 202

The method of embodiment 201 wherein the non-aqueous electrolyte comprises an organic molten salt, an inorganic molten salt, or a combination thereof.

Embodiment 203

The method of embodiment 201 or 202 wherein the majority of the ions comprised by the non-aqueous electrolyte are inorganic ions.

Embodiment 204

The method of embodiment 201 or 202 wherein at least 60% of the ions comprised by the non-aqueous electrolyte are inorganic ions.

Embodiment 205

The method of embodiment 201 or 202 wherein at least 70% of the ions comprised by the non-aqueous electrolyte are inorganic ions.

Embodiment 206

The method of embodiment 201 or 202 wherein at least 80% of the ions comprised by the non-aqueous electrolyte are inorganic ions.

Embodiment 207

The method of embodiment 201 or 202 wherein at least 90% of the ions comprised by the non-aqueous electrolyte are inorganic ions.

Embodiment 209

The method of embodiment 201 or 202 wherein at least 95% of the ions comprised by the non-aqueous electrolyte are inorganic ions.

Embodiment 210

The method of embodiment 201 or 202 wherein at least 99% of the ions comprised by the non-aqueous electrolyte are inorganic ions.

Embodiment 210A

The method of any of enumerated embodiments 201-210 wherein the non-aqueous electrolyte is a molten salt.

Embodiment 211

The method of any of enumerated embodiments 201-210A wherein the non-aqueous electrolyte comprises a molten hydroxide salt, a molten halide salt, a molten nitrate salt, a molten nitrite salt, a molten sulfate salt or a combination thereof.

Embodiment 212

The method of any of enumerated embodiments 201-211 wherein the non-aqueous electrolyte comprises a hydroxide salt selected from the group consisting of LiOH, KOH, NaOH, RbOH, CsOH, and combinations thereof.

Embodiment 213

The method of any of enumerated embodiments 201-212 wherein the non-aqueous electrolyte comprises a halide salt selected from the group consisting of LiCl, LiF, KF, KCl, NaCl, NaF, LiBr, NaBr, KBr, LiI, NaI, KI, $AlCl_3$, and combinations thereof.

Embodiment 214

The method of any of enumerated embodiments 201-213 wherein the non-aqueous electrolyte comprises a nitrate salt selected from the group consisting of $LiNO_3$, $NaNO_3$, $KNO_3$, and combinations thereof.

Embodiment 215

The method of any of enumerated embodiments 201-214 wherein the non-aqueous electrolyte comprises a nitrite salt selected from the group consisting of $LiNO_2$, $NaNO_2$, $KNO_2$, and combinations thereof.

Embodiment 216

The method of any of enumerated embodiments wherein the non-aqueous electrolyte comprises a sulfate salt selected from the group consisting of $Li_2SO_4$, $Na_2SO_4$, $K_2SO_4$, and combinations thereof.

Embodiment 217

The method of any of enumerated embodiments 201-216 wherein the non-aqueous electrolyte comprises a molten salt selected from the group consisting of LiOH, KOH, NaOH, RbOH, CsOH, LiCl, LiF, KF, KCl, NaCl, NaF, LiBr, NaBr, KBr, LiI, NaI, KI, $AlCl_3$, $LiNO_3$, $NaNO_3$, $KNO_3$, $LiNO_2$, $NaNO_2$, $KNO_2$, $Li_2SO_4$, $Na_2SO_4$, $K_2SO_4$, and combinations thereof.

Embodiment 217-1

The method of any of enumerated embodiments 201-217 wherein the non-aqueous electrolyte comprises an aprotic solvent.

Embodiment 217-2

The method of any of enumerated embodiments 201-217-1 wherein the non-aqueous electrolyte comprises an ester, ether, or a carbonate.

Embodiment 217-3

The method of any of enumerated embodiments 201-217-2 wherein the non-aqueous electrolyte comprises an ester selected from the group consisting of ethyl acetate, methyl butyrate, and ethyl butyrate.

Embodiment 217-4

The method of any of enumerated embodiments 201-217-3 wherein the non-aqueous electrolyte comprises an ether selected from the group consisting of dipropylene glycol dimethyl ether, dimethyl ether, diethyl ether, tetrahydrofuran, and dimethoxyethane.

Embodiment 217-5

The method of any of enumerated embodiments 201-217-4 wherein the non-aqueous electrolyte comprises a carbonate selected from the group consisting of propylene carbonate, ethylene carbonate, butylene carbonate, dimethyl carbonate, diethyl carbonate, and ethylmethyl carbonate.

Embodiment 217-6

The method of any of enumerated embodiments 201-217-5 wherein the non-aqueous solvent comprises an aprotic solvent selected from the group consisting of dimethyl sulfoxide and acetonitrile.

Embodiment 218

The method of any of enumerated embodiments 201-217-6 wherein the working electrode is selected from the group consisting of metals, metal alloys, ceramics, carbon (including all of the allotropes thereof), electrically conductive polymers, and electrically conductive composite materials.

Embodiment 219

The method of any of embodiments 201-218 wherein the working electrode is selected from the group consisting of metals, metal alloys, ceramics, carbon (including all of the allotropes thereof), electrically conductive polymers, and electrically conductive composite materials.

Embodiment 220

The method of any of embodiments 201-218 wherein the working electrode is selected from the group consisting of aluminum, copper, chromium, cobalt, manganese, nickel, silver, gold, tin, platinum, palladium, zinc, tungsten, tantalum, rhodium, molybdenum, titanium, iron, zirconium, vanadium, and hafnium, and the alloys thereof.

Embodiment 221

The method of any of embodiments 201-218 wherein the working electrode is selected from the group consisting of borides, carbide, and silicides.

Embodiment 222

The method of any of embodiments 201-218 wherein the working electrode is selected from the group consisting of titanium boride, harfnium boride, magnesium boride, chromium boride, vanadium boride, aluminum boride, tungsten carbide, titanium carbide, chromium carbide, molybdenum carbide, hafnium carbide, tantalum carbide, vanadium carbide, tungsten silicide, titanium silicide, vanadium silicide, nickel silicide, platinum silicide, chromium silicide, copper silicide, and zirconium silicide.

Embodiment 223

The method of any of embodiments 201-218 wherein the working electrode is selected from the group consisting of indium tin oxide and fluorinated tin oxide.

Embodiment 224

The method of any of embodiments 201-218 wherein the working electrode is selected from the group consisting of conductive carbon particles, carbon nanotubes, carbon fibers, fullerenes, graphene, graphite, and glassy carbon.

Embodiment 225

The method of any of embodiments 201-218 wherein the working electrode comprises polyanaline.

Embodiment 226

The method of any of embodiments 201-218 wherein the working electrode comprise a composite containing conductive filler such as conductive particles, fibers, or sheets.

Embodiment 227

The method of any of enumerated embodiments wherein the working electrode is substantially planar.

Embodiment 228

The method of any of embodiments 201-226 wherein the working electrode is a sheet or foil.

Embodiment 229

The method of any of embodiments 201-226 wherein the working electrode is a three dimensional working electrode.

Embodiment 230

The method of any of embodiments 201-226 wherein the lithiated transition metal oxide ceramic is electrodeposited onto the surface(s) of a three-dimensional working electrode having a regular geometric.

Embodiment 231

The method of any of embodiments 201-226 wherein the lithiated transition metal oxide ceramic is electrodeposited onto the surface(s) of a three-dimensional working electrode having a prismatic, cuboidal, pyramidal, truncated pyramidal, conical, truncated conical, cylindrical, domed cylindrical, truncated cylindrical, barrel, or spherical shaped three-dimensional structure.

Embodiment 232

The method of any of embodiments 201-226 wherein the lithiated transition metal oxide ceramic is electrodeposited onto the surface(s) of a three-dimensional working electrode having an irregular shape.

Embodiment 234

The method of any of claims 201-226 wherein the lithiated transition metal oxide ceramic is electrodeposited onto the surface(s) of a three-dimensional working electrode having an open pore porous structure.

Embodiment 235

The method of any of enumerated embodiments 201-234 wherein the working electrode has a void volume fraction (porosity) of at least about 25%.

Embodiment 236

The method of any of enumerated embodiments 201-235 wherein the working electrode has a void volume fraction (porosity) of at least about 35%.

Embodiment 237

The method of any of enumerated embodiments 201-236 wherein the working electrode has a void volume fraction (porosity) of at least about 50%.

Embodiment 238

The method of any of enumerated embodiments 201-237 wherein the working electrode has a void volume fraction (porosity) of at least about 60%.

Embodiment 239

The method of any of enumerated embodiments 201-238 wherein the working electrode has a void volume fraction (porosity) of at least about 75%.

Embodiment 240

The method of any of enumerated embodiments 201-239 wherein the working electrode has a void volume fraction (porosity) of at least about 90%.

Embodiment 241

The method of any of enumerated embodiments 201-240 wherein the working electrode has a void volume fraction (porosity) of at least about 95%.

Embodiment 242

The method of any of enumerated embodiments 201-241 wherein the working electrode has a void volume fraction (porosity) of at least about 99%.

Embodiment 243

The method of any of enumerated embodiments 201-242 wherein the working electrode is an electrically conductive porous structure comprising unit cells having an average size in the range of about 10 nm to about 100 µm.

Embodiment 244

The method of any of enumerated embodiments 201-243 wherein the working electrode is an electrically conductive porous structure comprising unit cells having an average size in the range of about 10 nm to 50 µm.

Embodiment 245

The method of any of enumerated embodiments 201-244 wherein the working electrode is an electrically conductive porous structure comprising unit cells having an average size in the range of about 10 nm to about 25 µm.

Embodiment 246

The method of any of enumerated embodiments 201-245 wherein the working electrode is an electrically conductive porous structure comprising unit cells having an average size in the range of about 10 nm to about 10 µm.

Embodiment 247

The method of any of enumerated embodiments 201-246 wherein the working electrode is an electrically conductive porous structure comprising unit cells having an average size in the range of about 100 nm to about 10 µm.

Embodiment 248

The method of any of enumerated embodiments 201-247 wherein the working electrode is an electrically conductive porous structure comprising unit cells having an average size in the range of about 100 nm to about 5 µm.

Embodiment 249

The method of any of enumerated embodiments 201-248 wherein the working electrode is an electrically conductive porous structure comprising unit cells having an average size in the range of about 0.2 µm to about 2 µm.

Embodiment 250

The method of any of enumerated embodiments 201-249 wherein the working electrode is an electrically conductive porous structure comprising unit cells having an average size in the range of about 0.4 µm to about 2 µm.

Embodiment 251

The method of any of enumerated embodiments 201-250 wherein the working electrode is an electrically conductive porous structure comprising unit cells having an average size in the range of about 0.5 µm to about 1.5 µm.

Embodiment 252

The method of any of enumerated embodiments 201-251 wherein the working electrode has a thickness of at least 1 µM.

Embodiment 253

The method of any of enumerated embodiments 201-252 wherein the working electrode has a thickness of at least 10 µM.

Embodiment 254

The method of any of enumerated embodiments 201-253 wherein the working electrode has a thickness of at least 50 µM.

Embodiment 255

The method of any of enumerated embodiments 201-254 wherein the working electrode has a thickness of at least 100 µM.

Embodiment 256

The method of any of enumerated embodiments 201-255 wherein the working electrode has a thickness of at least 200 µM.

Embodiment 257

The method of any of enumerated embodiments 201-256 wherein the working electrode has a thickness of at least 500 µM.

Embodiment 258

The method of any of enumerated embodiments 201-257 wherein the working electrode has a thickness of at least 750 µM.

Embodiment 259

The method of any of enumerated embodiments 201-258 wherein the working electrode has a thickness of at least 1 mm.

Embodiment 260

The method of any of enumerated embodiments 201-259 wherein the working electrode has a thickness of at least 2 mm.

Embodiment 261

The method of any of enumerated embodiments 201-260 wherein the working electrode has a thickness of at least 3 mm.

Embodiment 262

The method of any of enumerated embodiments 201-261 wherein the working electrode has a thickness of at least 4 mm.

Embodiment 263

The method of any of enumerated embodiments 201-262 wherein the working electrode has a thickness of at least 5 mm.

Embodiment 264

The method of any of enumerated embodiments 201-263 wherein the working electrode comprises unit cells having an average size in the range of about 10 nm to about 100 μm.

Embodiment 265

The method of any of enumerated embodiments 201-264 wherein the lithiated transition metal oxide is conformally coated onto the working electrode.

Embodiment 266

The method of any of enumerated embodiments 201-265 wherein the transition metal source in the plating bath comprises at least one of aluminum ($Al_2O_3$, $AlCl_3$) and transition metal (TM) compounds (TM oxides, TM chrolides, TM sulfates).

Embodiment 301

A method of forming a lithiated transition metal oxide comprising the steps of: immersing a working electrode into a non-aqueous electrolyte comprising a lithium source and a transition metal source, electrodepositing a lithiated transition metal oxide onto a surface of the working electrode from the electrolyte at a temperature in excess of the melting temperature of the non-aqueous electrolyte, removing the working electrode from the bath and rinsing the electrodeposited lithiated transition metal oxide.

Embodiment 302

The method of embodiment 301 wherein the non-aqueous electrolyte comprises an organic molten salt, an inorganic molten salt, or a combination thereof.

Embodiment 303

The method of embodiment 302 wherein the majority of the ions comprised by the non-aqueous electrolyte are inorganic ions.

Embodiment 304

The method of embodiment 301 wherein at least 99% of the ions comprised by the non-aqueous electrolyte are inorganic ions.

Embodiment 305

The method of embodiment 301 wherein the non-aqueous electrolyte comprises a molten acetate salt, a molten carbonate salt, a molten sulfide salt, a molten silicate, a molten aluminate, a molten hydroxide salt, a molten halide salt, a molten nitrate salt, a molten nitrite salt, a molten sulfate salt or a combination thereof.

Embodiment 305A

The method of embodiment 301 wherein the lithiated transition metal is selected from Period 4, 5, or 6 and combinations thereof.

Embodiment 305B

The method of embodiment 301 wherein the lithiated transition metal oxide has the formula $Li_xM_yO_n$ where M is a Period 4, 5 or 6 transition metal or combination thereof, x is greater than 0 and less than about 1.2, y is about 0.5 to about 1, n is about 1.5 to about 2.5, and the ratio $(2n-x)/y$ ranges from about 2.5 to about 3.7.

Embodiment 305C

The method of embodiment 305B wherein M comprises one or more metals selected from the group consisting of Ti, V, Cr, Mn, Co, Ni, Mo, W, Zr, Mg, Al, Cu, Fe, and Zn.

Embodiment 305D

The method of embodiment 301 wherein the lithiated transition metal oxide comprises $LiCoO_2$, $LiMnO_2$, or $LiNi_aMn_bCo_{1-a-b}O_2$ where a is greater than 0 and less than about 1, b is greater than 0 and less than about 1, and a+b is greater than 0 and less than about 1.

Embodiment 305E

The method of embodiment 301 wherein the transition metal source is selected from the group consisting of nitrates, nitrites, sulfates, halides, hydroxides, oxides, alkoxides and acetates of a transition metal.

Embodiment 305F

The method of embodiment 305E wherein the transition metal comprises cobalt and the transition metal source comprises CoO, $Co_2O_3$, $Co(OH)_2$, $CO_3O_4$, $CoCl_2$, $CoSO_4$, $Co(NO_3)_2$ $Co(NO_2)_2$, $Co(C_2H_3O_2)_2$.

Embodiment 305G

The method of embodiment 305E wherein the transition metal comprises manganese and the transition metal source comprises $MnCl_2$, $MnSO_4$, $Mn(CH□COO)□$, $Mn(NO□)□$, or $Mn(NO_2)_2$.

Embodiment 305H

The method of any of enumerated embodiments 305E, 305F and 305G wherein the transition metal source material comprises a hydrate or anhydrate.

Embodiment 305I

The method of any of enumerated embodiments 301-305H wherein the lithiated transition metal oxide is doped with a non-transition metal.

Embodiment 305J

The method of embodiment 305I wherein the non-transition metal dopant is selected from the group consisting of magnesium, aluminum, silicon, fluorine, and combinations thereof.

Embodiment 305K

The method of embodiment 305I or 305J wherein the lithiated transition metal oxide has the chemical formula is $Li_xM_{1-y}A_yO_{2-z}F_z$. wherein M is transition metal, A is the dopant metal, x ranges from greater than 0 to 1, and y and z range from 0 to 0.2.

Embodiment 305L

The method of embodiment 305K wherein A comprises Mg, Si, or Al.

Embodiment 306

The method of any of enumerated embodiments 301-305L wherein the non-aqueous electrolyte comprises a hydroxide salt selected from the group consisting of LiOH, KOH, NaOH, RbOH, and CsOH, a halide salt selected from the group consisting of LiCl, LiF, KF, KCl, NaCl, NaF, LiBr, NaBr, KBr, LiI, NaI, KI, and $AlCl_3$, and a nitrate salt selected from the group consisting of $LiNO_3$, $NaNO_3$, and $KNO_3$, and combinations thereof.

Embodiment 307

The method of any of enumerated embodiments 301-306 wherein the non-aqueous electrolyte comprises a nitrite salt selected from the group consisting of $LiNO_2$, $NaNO_2$, $KNO_2$, and combinations thereof.

Embodiment 307A

The method of any of enumerated embodiments 301-307 wherein the non-aqueous electrolyte comprises an aprotic solvent.

Embodiment 307B

The method of any of enumerated embodiments 301-307A wherein the non-aqueous solvent comprises an aprotic solvent selected from the group consisting of dimethyl sulfoxide and acetonitrile.

Embodiment 307C

The method of any of enumerated embodiments 301-307B wherein the non-aqueous electrolyte comprises an ester, ether, or a carbonate.

Embodiment 307D

The method of any of enumerated embodiments 301-307C wherein the non-aqueous electrolyte comprises an ester selected from the group consisting of ethyl acetate, methyl butyrate, and ethyl butyrate.

Embodiment 307E

The method of any of enumerated embodiments 301-307D wherein the non-aqueous electrolyte comprises an ether selected from the group consisting of dipropylene glycol dimethyl ether, dimethyl ether, diethyl ether, tetrahydrofuran, and dimethoxyethane.

Embodiment 307F

The method of any of enumerated embodiments 301-307E wherein the non-aqueous electrolyte comprises a carbonate selected from the group consisting of propylene carbonate, ethylene carbonate, butylene carbonate, dimethyl carbonate, diethyl carbonate, and ethylmethyl carbonate.

Embodiment 308

The method of claim any of enumerated embodiments 301-307F wherein the working electrode is selected from the group consisting of metals, metal alloys, ceramics, carbon, electrically conductive polymers, and electrically conductive composite materials.

Embodiment 309

The method of any of enumerated embodiments 301-308 wherein the working electrode is selected from the group consisting of aluminum, copper, chromium, cobalt, manganese, nickel, silver, gold, tin, platinum, palladium, zinc, tungsten, tantalum, rhodium, molybdenum, titanium, iron, zirconium, vanadium, and hafnium, and the alloys thereof.

Embodiment 310

The method of any of enumerated embodiments 301-309 wherein the working electrode is selected from the group consisting of conductive carbon particles, carbon nanotubes, carbon fibers, fullerenes, graphene, graphite, pyrolitic carbon, and glassy carbon.

Embodiment 311

The method of any of enumerated embodiments 301-310 wherein the lithiated transition metal oxide ceramic is electrodeposited onto the surface(s) of a three-dimensional working electrode having an open pore porous structure.

Embodiment 312

The method of any of enumerated embodiments 301-311 wherein the working electrode has a void volume fraction (porosity) of at least about 90%.

Embodiment 313

The method of any of enumerated embodiments 301-312 wherein the working electrode is an electrically conductive porous structure comprising unit cells having an average size in the range of about 10 nm to about 100 µm.

Embodiment 314

The method of any of enumerated embodiments 301-313 wherein the working electrode is an electrically conductive porous structure comprising unit cells having an average size in the range of about 10 nm to about 10 µm.

Embodiment 315

The method of any of enumerated embodiments 301-314H wherein the working electrode has a thickness of at least 30 µm.

Embodiment 315A

The method of any of enumerated embodiments 301-315 wherein the working electrode has a thickness of at least 100 µm.

Embodiment 315B

The method of any of enumerated embodiments 301-315A wherein the lithiated transition metal oxide ceramic is electrodeposited onto the surface(s) of a three-dimensional working electrode having an open pore porous structure and the working electrode has a thickness of at least 100 µm.

Embodiment 315C

The method of any of enumerated embodiments 301-315B wherein the lithiated transition metal oxide ceramic is electrodeposited onto the surface(s) of a three-dimensional working electrode having an open pore porous structure and the working electrode has a thickness of at least 200 µm.

Embodiment 316

The method of any of enumerated embodiments 301-315C wherein the lithiated transition metal oxide is conformally coated onto the working electrode.

Embodiment 317

The method of any of enumerated embodiments 301-316 wherein the source of the transition metal in the plating bath comprises an oxide, halide or sulfate of at least one transition metal.

Embodiment 318

The method of any of enumerated embodiments 301-317 wherein the electrodeposition is carried out at a temperature in the range of about 100 to about 600° C.

Embodiment 318A

The method of any of enumerated embodiments 301-317 wherein the electrodeposition is carried out at a temperature in the range of about 200 to about 600° C.

Embodiment 319

The method of any of enumerated embodiments 301-317 wherein the electrodeposition is carried out at a temperature in the range of about 300 to about 400° C.

Embodiment 320

The method of any of enumerated embodiments 301-319 wherein electrodeposition is carried out at a pressure of less than 2 atmospheres.

Embodiment 321

The method of any of enumerated embodiments 301-319 wherein the electrodeposition is carried out at atmospheric pressure.

Embodiment 322

The method of any of enumerated embodiments 301-321 wherein the thickness of the electrodeposited lithiated transition metal oxide ranges from 10 nm to 100 µm.

Embodiment 323

The method of any of enumerated embodiments 301-322 wherein the electrodeposited lithiated transition metal oxide is lithium cobalt oxide characterized by a Raman spectrum containing a peak at approximately 680 $cm^{-1}$.

Embodiment 324

A composite structure comprising a conformal coating of a lithiated transition metal oxide on a carbon scaffold.

Embodiment 325

The composite structure of embodiment 324 wherein the composite structure has an open pore porous structure.

Embodiment 326

The composite structure of embodiment 324 wherein the composite structure has a void volume fraction (porosity) of at least about 95%.

Embodiment 327

The composite structure of embodiment 324 wherein the composite structure is an open cell porous structure comprising unit cells having an average size in the range of about 10 nm to about 100 µm.

Embodiment 328

A primary or secondary battery comprising a composite structure, the composite structure comprising a conformal coating of a lithiated transition metal oxide on a carbon scaffold.

Embodiment 329

A primary or secondary battery comprising a composite structure, the composite structure comprising a conformal coating of a lithiated transition metal oxide on a structure comprising a metal current collector and a carbon scaffold.

EXAMPLES

Example 1: LiCoO$_2$ Plating on Carbon Cloth

Figure 3:
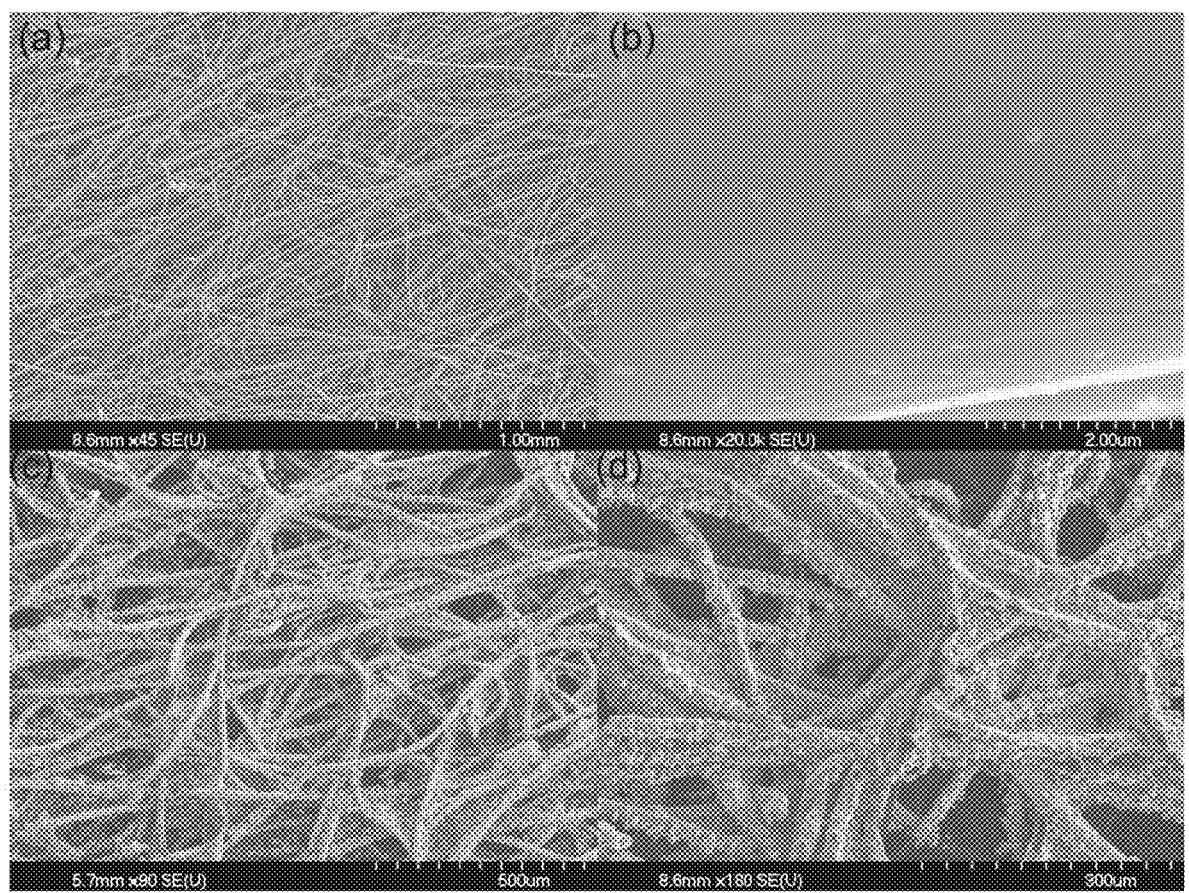
FIG. 3 is a series of SEM images. Panel 3(a) is a SEM image of carbon cloth comprising microfibers as described in Example 1. Panel 3(b) is a SEM image of panel 3(a), at increased magnification as described in Example 1. Panel 3(c) is a SEM image of the carbon cloth of panel 3(a) with an electrodeposited layer of $LiCoO_2$ thereon as described in Example 1. Panel 3(d) is the SEM image of panel 3(c) at increased magnification as described in Example 1.

A mixture of 1 g LiOH, 6 g KOH, and 2 g CsOH was ground and placed into a nickel crucible. After heating to 335° C., about 0.6 g CoCl$_2$ was added to the melt. The melt color changed from white to blue as the divalent cobalt ion was coordinated by hydroxide ions. After the added CoCl$_2$ was totally dissolved, carbon cloth made of carbon microfibers (FIG. 3, Panels a and b) was inserted into the melt and voltage pulses (1.2V vs cobalt reference) were applied. Between pulses, there was an open circuit voltage period (about 10 sec). No current was applied. Only open circuit voltage (OCV) was monitored. The cobalt ions in the depleted region close to the surface of the scaffold were replenished by ion diffusion. Repeated voltage pulses and OCV periods enabled the conformal deposition of LiCoO$_2$ onto the 3D porous carbon cloth scaffold and eliminate the non-uniformity of coating caused by ion depletion. The bare carbon microfibers (FIG. 3, Panel b) were coated with crystallized LiCoO$_2$ particles. The cloth is taken out the bath and rinsed with water after cooling down. The LiCoO$_2$ coated carbon cloth was observed by scanning electron microscope (SEM). The images are shown in FIGS. 3c and 3d.

Figure 4:
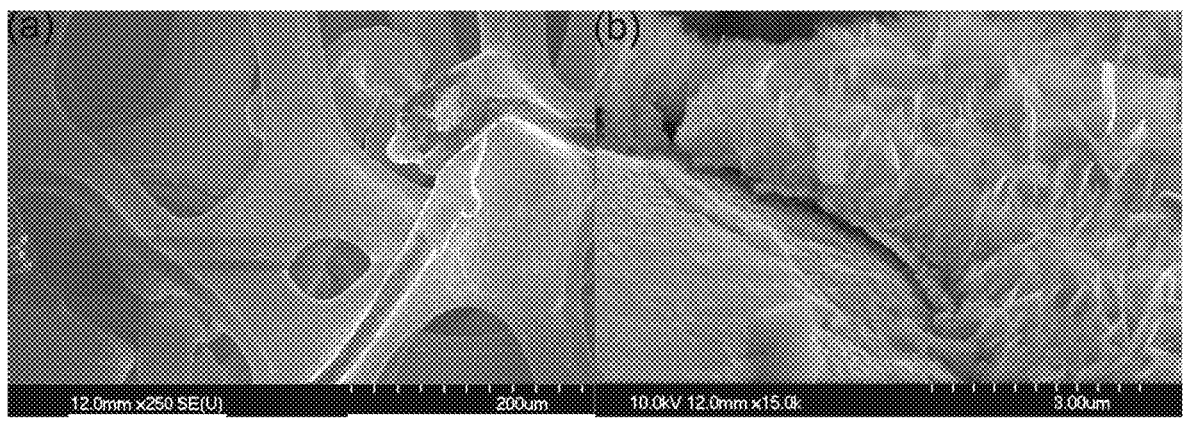
FIG. 4 is a series of SEM images. Panel 4(a) is a SEM image of a commercial available nickel foam as described in Example 2. Panel 4(b) is a SEM image of the commercially available nickel foam of panel 4(a) with an electrodeposited layer of $LiCoO_2$ on the nickel foam prepared as described in Example 2.

Example 2: LiCoO$_2$ Plating on Nickel Foam 1 g LiOH and 8 g KOH were mixed and ground for molten salt plating. 1 g CoSO$_4$ was used as the cobalt source. When the cobalt was dissolved in the melt of hydroxides in an alumina crucible at 315° C., a piece of commercial nickel foam (FIG. 4, Panel a) was inserted in the molten salt bath as the working electrode. 1V pulses (2 sec) were repeatedly applied between the nickel foam and cobalt rod (reference). The intervals between pulses were voltage monitoring. No current passed through the working electrode. After 100 cycle electrodeposition, the nickel foam was removed from the plating bath and washed with water. The SEM image was shown on FIG. 4b, which shows the well crystallized LiCoO$_2$ plates on the surface of nickel foam.

Example 3: LiCoO$_2$ Plating on Carbon Nanotube Mat

A carbon nanotube mat (CNM) consisting of vapor grown carbon nanofibers and a carbon microfiber mesh(FIG. 5, Panel a) was used as the electrode scaffold. The carbon nanotubes provide the relatively large coating surface. Two layers of carbon nanotubes sandwich one layer of microfiber mesh in-between. Microfibers layer could reinforce the mechanical properties of the mat. The CNM scaffold was used as the working electrode as shown in FIG. 2. The plating bath was prepared by mixing and grinding 1 g LiOH, 6 g KOH, and 2 g CsOH. After melting the mixture at 350° C., about 0.6 g CoO was added to the bath. The plating technique employed the 1.2V voltage pulse for 1.5 sec and OCV for 10 sec. After running 150 cycles, the CNM was taken out the bath. The salt residual on the sample was washed off by water. The sample was then placed in an 80° C. oven and dried for 2 h. Before assembling the coin cell, the LiCoO$_2$ coated CNM was dried at 150° C. for 1 h.

Figure 5:
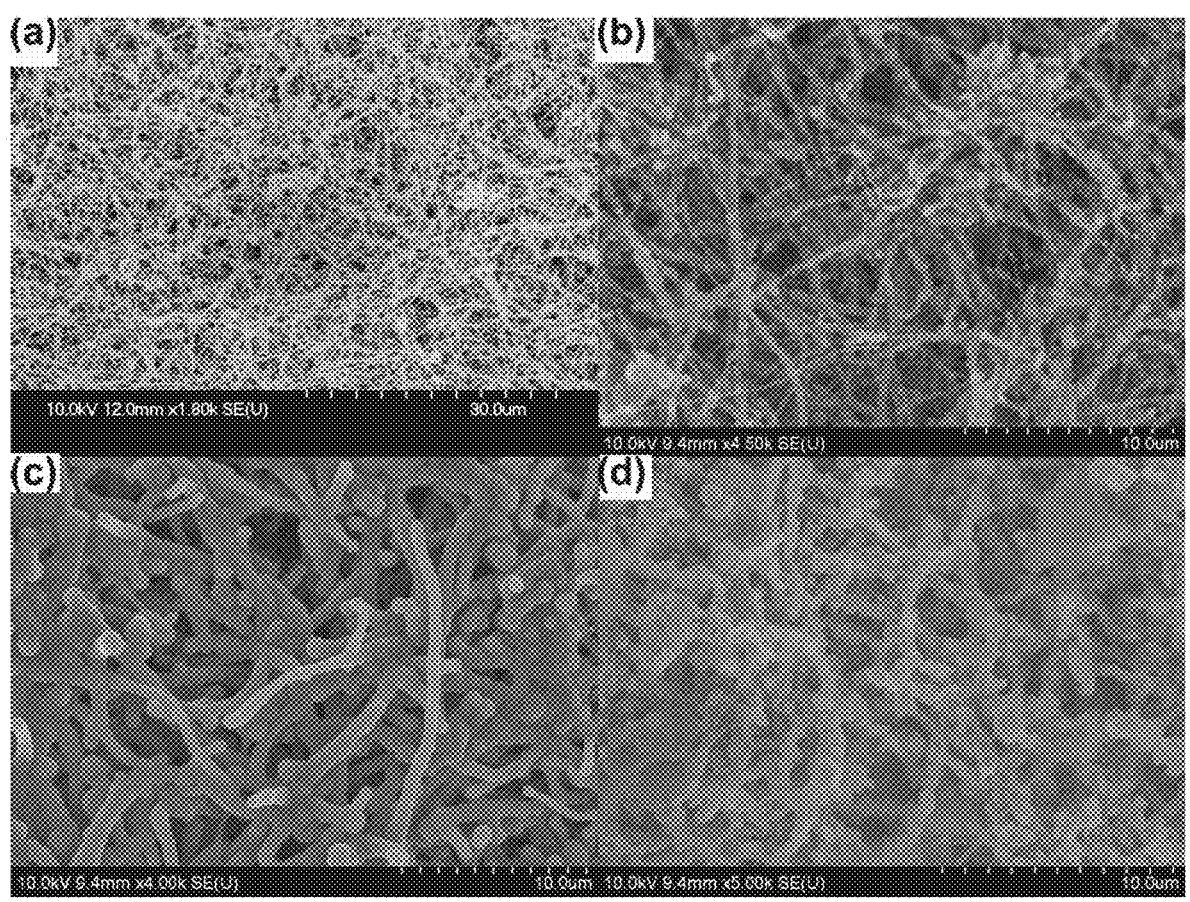
FIG. 5 is a series of SEM images. Panel 5(a) is a SEM image of a commercially available carbon nanofiber mat (CNM) as described in Example 3. Panel 5(b) is a SEM image of the commercially available carbon nanofiber mat of panel 5(a) with an electrodeposited manganese oxide layer thereon (MOCNM) prepared as described in Example 3. The manganese oxide layer is used as the adhesion layer for the further deposition of other lithium transition metal oxides (for example, $LiCoO_2$). Panel 5(c) is a SEM image of an electrodeposited sample of manganese oxide prepared as described in in Example 3, indicating the thickness of manganese oxide deposition could be controlled. Panel 5(d) is a SEM image of an electrodeposited sample of $LiCoO_2$ electrodeposited on MOCNM prepared as described in in Example 3.

The diameter of carbon nanotubes was around 100 nm. Due to the small feature size and non-polar properties of carbon nanotubes, LiCoO$_2$ nucleation was difficult on its surface. Although high driving forces such as increased voltage, high temperature, and high ion concentration could induce the nucleation, it was hard to tune the thickness of LiCoO$_2$ coating. To assist the nucleation of LiCoO$_2$, a thin seeding layer of manganese oxide was coated on the carbon nanotube surface first. Manganese (II) sulfate and sodium acetate are dissolved to form 0.1~0.5M Mn$^{2+}$ and 0.1~0.5M Na$^+$ solution. A voltage pulse of 1.8 V for 2 sec with an interval of 10 sec was applied between the CNM and a Ag/AgCl reference electrode. Pt foil was used as the counter electrode. The repeated cycle number could control the thickness of electrodeposited manganese oxide. FIG. 5, Panels b and c shows the SEM images of 30 cycle and 300 cycle deposition. Actually, only 10~30 electrodeposition was enough for seeding LiCoO$_2$ nucleation. The manganese oxide coated CNM was heated at 300° C. in air for 3 h to remove moisture. The obtained sample was inserted the plating bath of 1 g LiOH, 6 g KOH, 2 g CsOH, and 0.6 g CoO. In the inert and dry atmosphere, 150 cycles of voltage pulse electrodeposition produced well crystallized LiCoO$_2$ platelets as shown in FIG. 5, Panel d.

Example 4: LiCoO$_2$ Powder Production

Figure 6A:
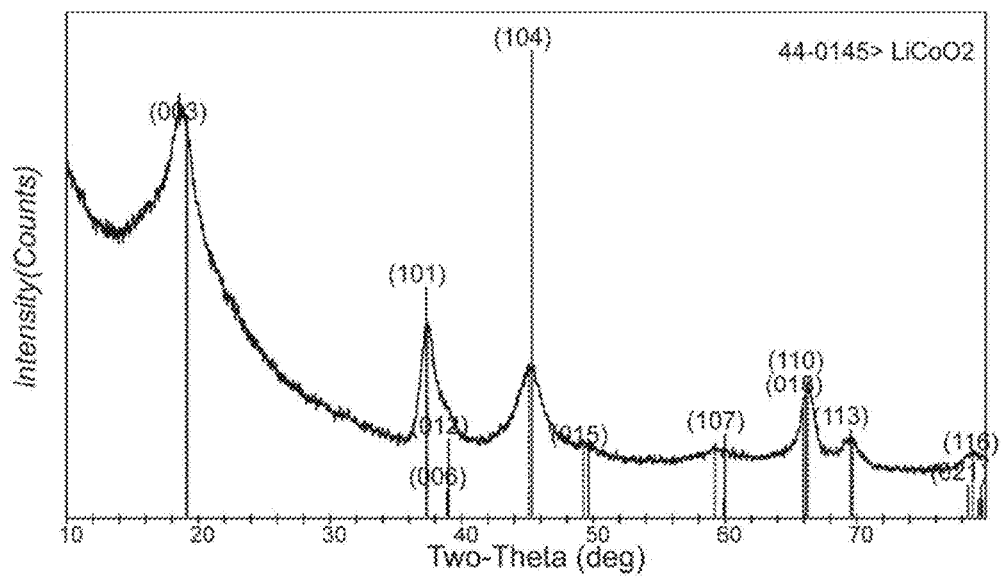
FIG. 6a is an X-ray diffraction pattern of electrodeposited $LiCoO_2$, prepared as described in Example 4 that has been scraped off a carbon rod electrode.
Figure 6B:
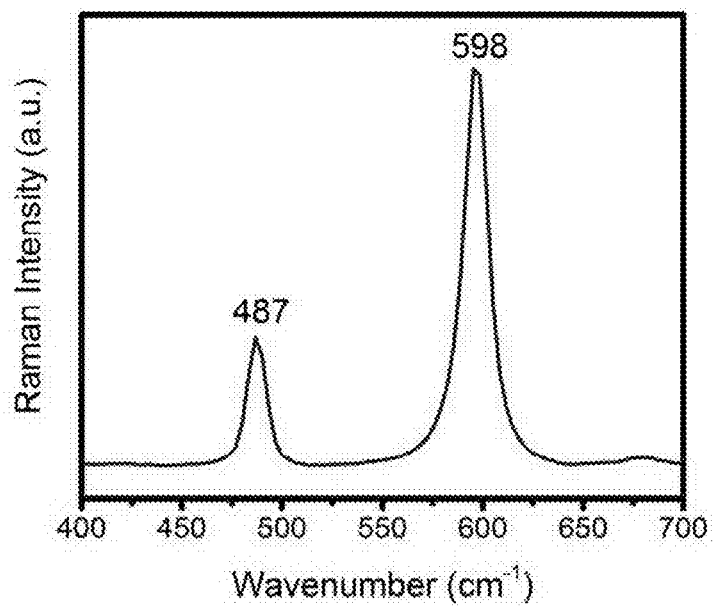
FIG. 6b is a Raman spectroscopy plot for electrodeposited $LiCoO_2$ as described in Example 4.

Besides the 3D conformal coating on a conductive scaffold, the LiCoO$_2$ electrodeposition technology in the disclosure can also be used for mass production. The composition bath of Example 3 was used for plating in this example. A large piece of carbon plate was used as the working electrode. 1V constant voltage was applied on the carbon plate for 1 h. The dark thick film was deposited on it. After washing with water, the coating was stripped off and dried at 80° C. for 1 h. The obtained powder was characterized by x-ray diffraction as shown in FIG. 6. All peaks were indexed to the JCPDF card #44-0145 LiCoO$_2$. In FIG. 6b, the Raman spectroscopy shows two distinct peaks around 487 and 598 cm$^{-1}$, which are typical characteristics of LiCoO$_2$. A very weak broad peak around 680 cm$^{-1}$ implies the slight delithiation as demonstrated by J Graetz (Electrochemical Society Proceeding, 2003, 28, 95-100).

Figure 7:
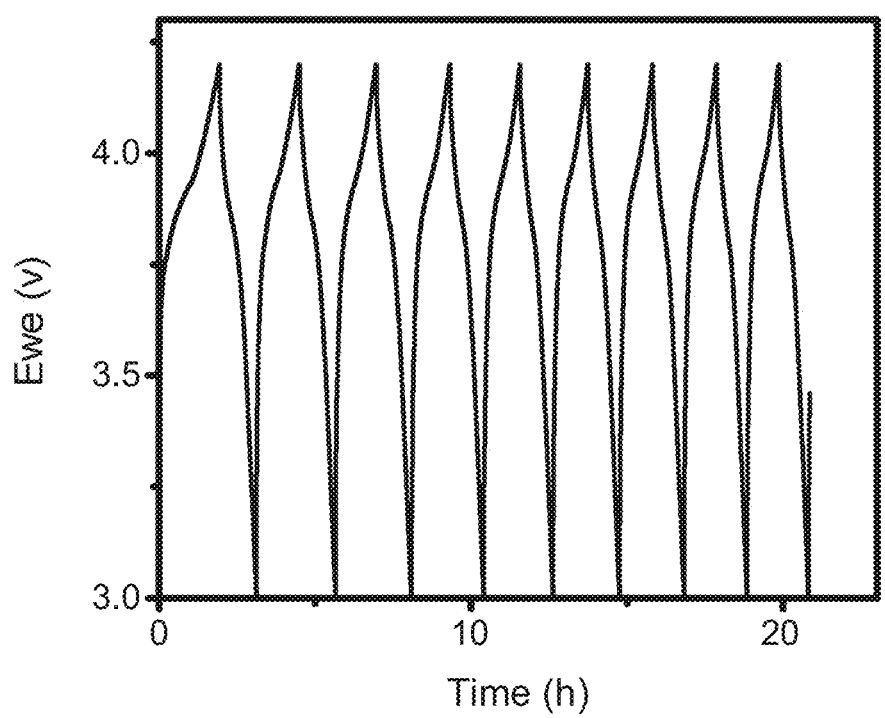
FIG. 7 is a galvanostatic cycling curve for the electrodeposited $LiCoO_2$ prepared as described in Example 4.

The powder was mixed with acetylene black (20 wt %) and PVDF binder (10 wt %) and ground with N-Methyl-2-pyrrolidone (NMP) to form slurry. The obtained slurry was casted on Al foil to form the cathode laminate. After drying at 150° C. for 3 h, the cut round sample was cut and assembled with lithium as the counter electrode and celgard separator. The coin cell was cycled with galvanostatic charge/discharge with potential limitation. The cycling curves in FIG. 7 show the good voltage plateau at 3.8V vs lithium, which was in agreement with the solid-state synthetized LiCoO$_2$.

Example 5: Lithium Manganese Oxide Plating

The mixture of 1 g LiOH and 8 g KOH was ground and placed into a nickel crucible. After heating to 325° C., about 0.3 g MnSO$_4$ was added to the melt. A piece of carbon nanotube mat was used as the working electrode. Voltage pulses (1.2V vs cobalt reference) are applied. Between two pulses, there was an open circuit voltage period (~7 sec to ~1 min). No current was applied and only voltage was monitored. The voltage pulses enable the deposition of lithium manganese oxide on the carbon nanotube mat. After deposition, the mat was taken out the bath and rinsed with water.

Figure 8:
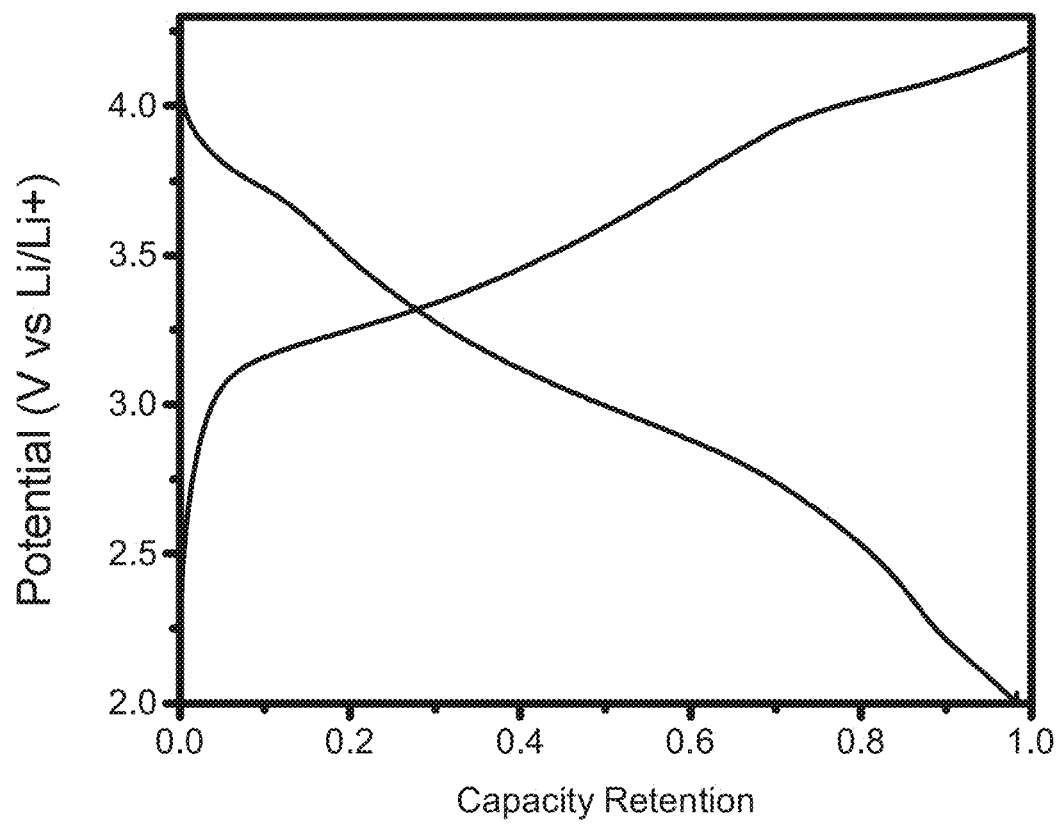
FIG. 8 is the charge/discharge curves for the electrodeposited lithiated manganese oxide prepared as described in Example 5.

The sample was assembled with lithium foil in a coin cell and cycled with galvanostatic charge/discharge with potential limitations. The charge/discharge curves in FIG. 8 show two nearly distinguishable voltage plateaus, indicating a possibility of containing spinel-like phase.

Example 6: Al-Doped LiCoO$_2$ Plating

Figure 9:
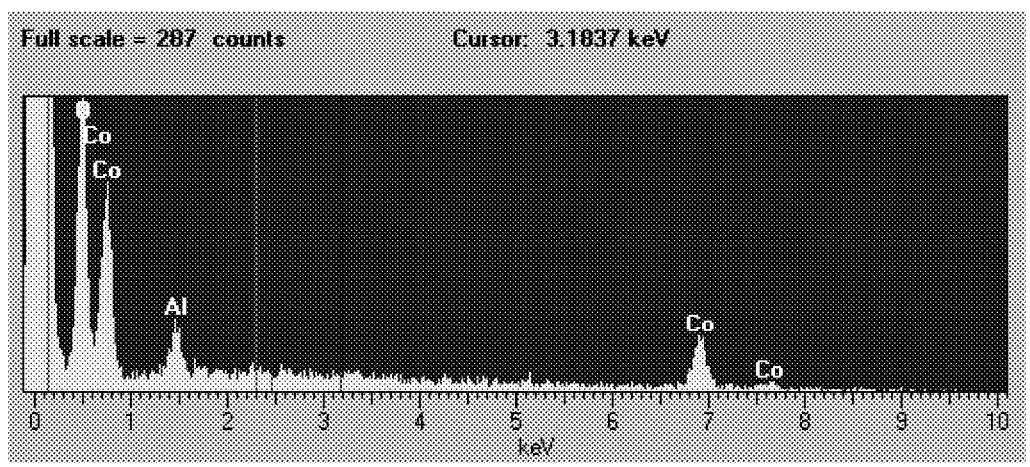
FIG. 9 is the energy dispersive x-ray spectroscopy for the electrodeposited Al-doped lithiated cobalt oxide prepared as described in Example 6.

The mixture of 1 g LiOH, 6 g KOH, and 2 g CsOH was ground and placed into a nickel crucible. After heating to 325° C., about 0.6 g CoCl$_2$ and 0.05 g Al$_2$O$_3$ nanoparticles were added to the melt. A piece of carbon nanotube mat was used as the working electrode. Voltage pulses (1.2V vs cobalt reference) were applied. Between two pulses, there was an open circuit voltage period (~7 sec to ~1 min). The voltage pulses enabled the uniform deposition of Al-doped lithium cobalt oxide into the pores of the carbon nanotube mat. After deposition, the mat was removed from the bath and rinsed with water. The elemental composition was identified with energy dispersive spectroscopy as shown in FIG. 9.

Example 7: Lithium Cobalt/Manganese/Nickel Oxide Plating

Figure 10:
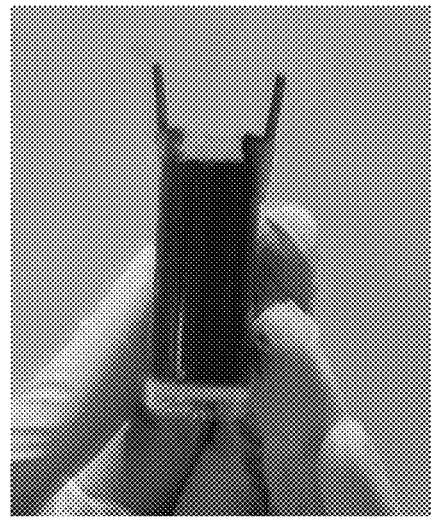
FIG. 10 is an optical image of a flexible lithium ion battery with $LiCoO_2$ as cathode and carbon nanotube mat as the anode prepared as described in Example 8.

The mixture of 1 g LiOH, 6 g KOH, and 2 g CsOH was ground and placed into a nickel crucible. After heating to 335° C., about 1.0 g CoCl$_2$, 0.2 g MnSO$_4$, 0.2 g NiCl$_2$ are added to the melt. A piece of carbon nanotube mat was used as the working electrode. The voltage pulses (1.2V vs cobalt reference) are applied. Between two pulses, there was an open circuit voltage period (about 7 sec). The voltage pulses enable the deposition of Al-doped lithium cobalt oxide on the carbon nanotube mat. After deposition, the mat was taken out the bath and rinsed with water. The elemental analysis was done with energy dispersive spectroscopy as shown in FIG. 10.

Example 8: Flexible Batteries

Figure 11:
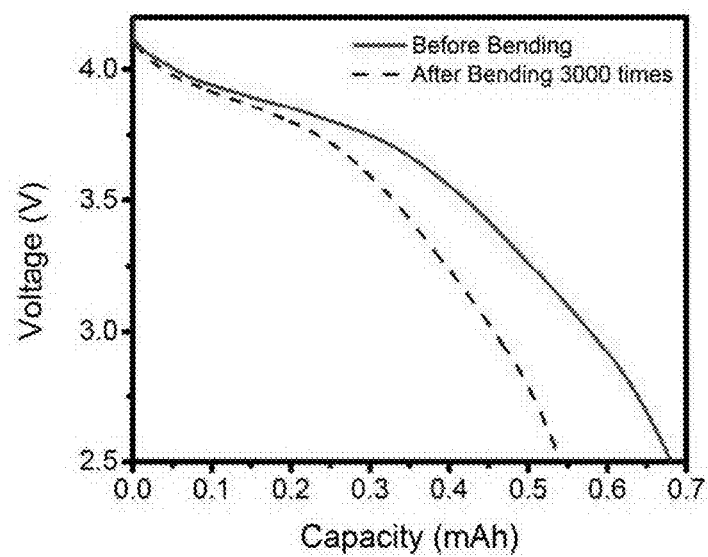
FIG. 11 is a discharge curve of a flexible cell with a $LiCoO_2$ cathode and carbon nanotube mat anode before and after bending 3000 times as described in Example 8.

A carbon nanotube mat (CNM) consisting of vapor grown carbon nanofibers and a carbon microfiber mesh was used for the mechanical scaffold to maintain the integrity. LiCoO$_2$ was electrodeposited on CNM using the procedure of Example 3. The carbon nanotubes in CNM could reversibly intercalate and deintercalate lithium ions as a graphite anode does. LiCoO$_2$ coated CNM and CNM as the cathode and anode are assembled in a plastic bag as shown in FIG. 10. The pouch cell obtained is bent 3000 times in a 3 hour period with a 30° bending angle and a radius of curvature of about 0.7 cm. The electrochemical properties are compared in FIG. 11. After bending, the pouch cell shows 79% of its initial capacity and similar voltage profile as prior to bending, indicating the LiCoO$_2$ coated CNM has ultra-flexible mechanical stability upon bending.

Example 9: Core-Shell Structure

Figure 12:
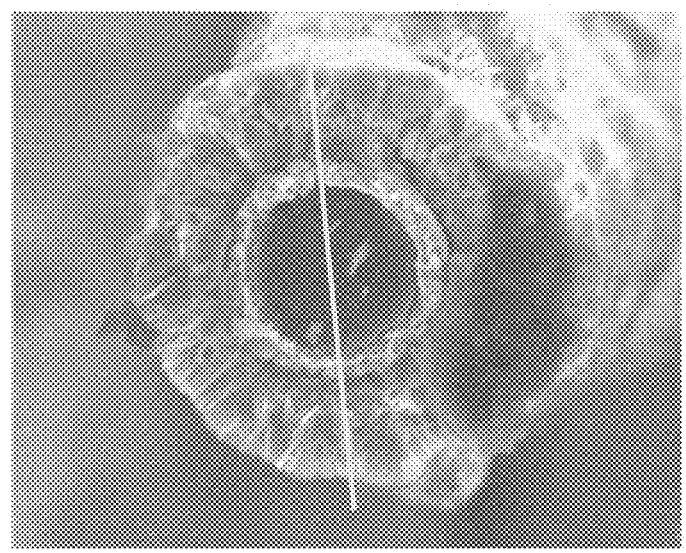
FIG. 12 is a SEM image of a core-shell structure with carbon fiber in the center, thin nickel layer, $LiCo_xMn_{1-x}O_2$ layer, and $LiCoO_2$ shell as described in Example 9.
Figure 13:
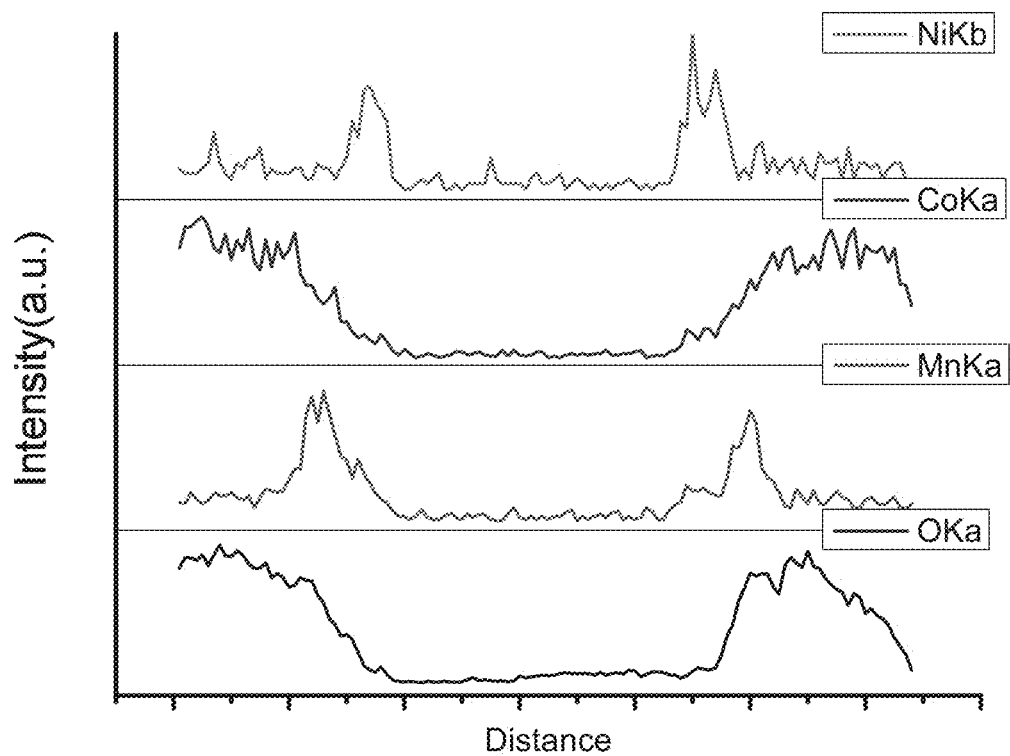
FIG. 13 is a EDX spectroscopy of O, Mn, Co, Ni in the core-shell structure along the line in SEM image of FIG. 12.

The mixture of 6 g LiOH and 36 g KOH, was ground and placed into a nickel crucible. After heating to 325° C., about 2.4 g MnSO$_4$, and 0.05 g CoCl$_2$ are added to the melt. A piece of nickel coated carbon fiber mesh was used as the working electrode. Voltage pulses (1.2V vs cobalt reference) are applied. Between two pulses, there was an open circuit voltage period (~7 sec to ~1 min). After deposition, the mesh was taken out the bath and rinsed with water. The cleaned mesh was inserted into the plating bath containing 6 g LiOH, 36 g KOH and 3.6 g CoCl$_2$ and applied with 1.2V voltage pulses. After deposition, the mesh was rinsed with water again. The cross-section of the mesh was observed with scanning electron microscope as shown in FIG. 12. The elemental analysis in FIG. 13 was conducted with energy dispersive spectroscopy. Both Mn and Co sources are mixed in the plating bath, the lithium-containing mixed transition metal oxide (LiCo$_x$Mn$_{1-x}$O$_2$) is obtained as demonstrated by the EDX spectroscopy.

In lithium ion batteries, core-shell structures are able to make full use of the unique properties of both the core material and shell materials. For examples, the voltage plateau of LiCoO$_2$ is higher (3.9V vs Li/Li+). Lithium manganese oxide (LMO) shows relatively large specific capacity. However, manganese atoms on the surface of LMO intend to dissolve in electrolyte due to Jahn-Teller distortion when the valence of Mn is close to +3. To obtain high capacity and maintain the overcharge stability, a LiCoO$_2$-coated LMO core-shell structure is desired. The core-shell structure disclosed here demonstrate a flexible operation and design to make complex structure of electrode structures, which is barely possible without the disclosure of molten salt electrodeposition.

Example 10: Cathodic Electrodeposition of Lithium Manganese Oxide

Figure 14:
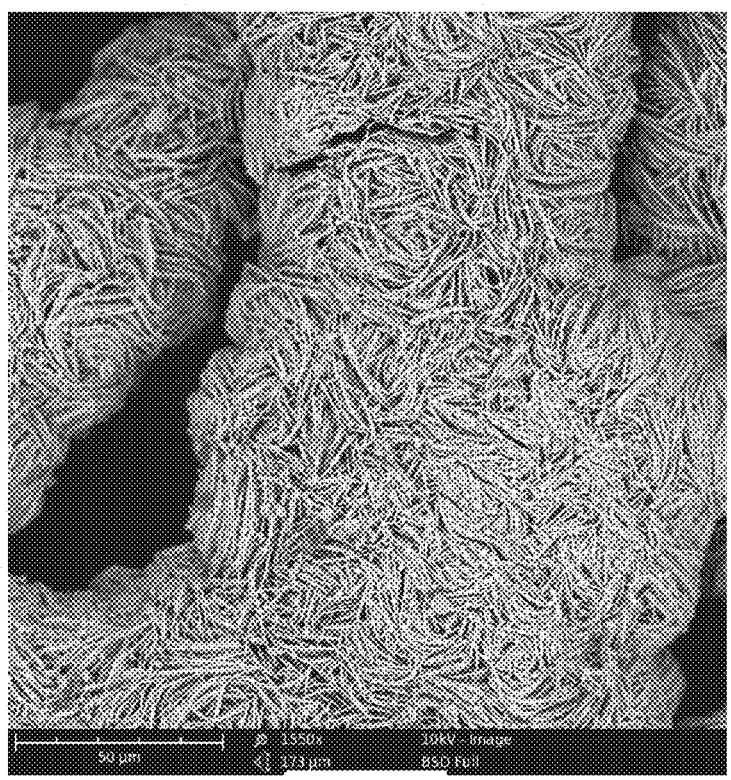
FIG. 14 is a SEM image of electrodeposited lithium manganese oxide with permanganate source via a reduction reaction as described more fully in Example 10.
Figure 15:
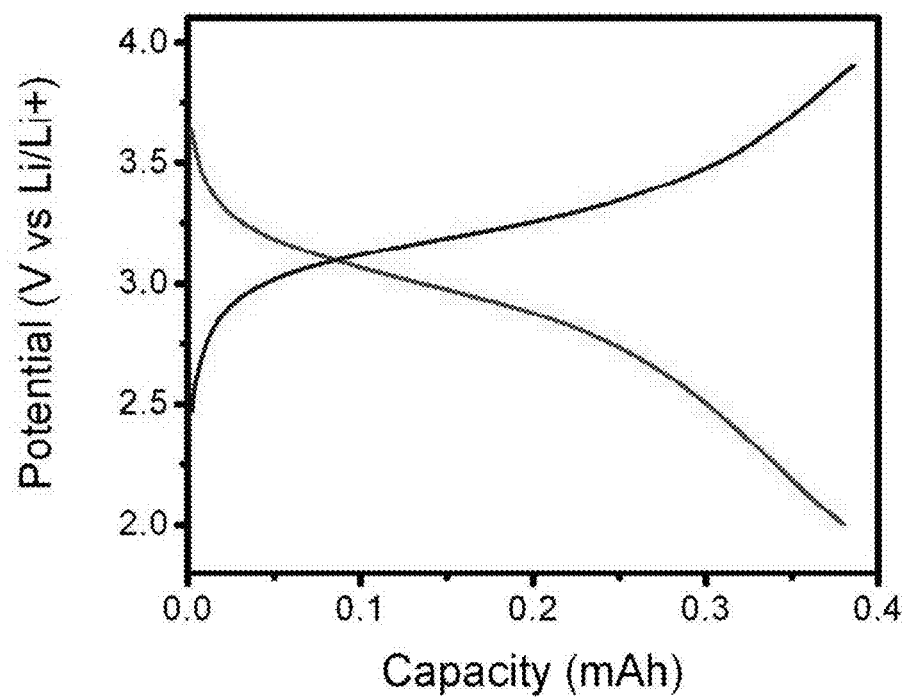
FIG. 15 is the charge/discharge properties of electrodeposited lithium manganese oxide prepared via a reduction reaction as described more fully in Example 10.

The mixture of 6 g LiOH and 36 g KOH, was ground and placed into a nickel crucible. After heating to 325° C., about 1 g KMnO$_4$ was added to the melt. A piece of carbon fiber mat was used as the working electrode and Pt as the counter and reference electrodes. Voltage pulses (−1.5V vs Pt reference) were applied. Between two pulses, there was an open circuit voltage period (about 1 min). After deposition, the mesh was taken out the bath and rinsed with water. The morphology of the lithium manganese oxide on carbon fibers was observed with SEM as shown in FIG. 14. The electrochemical properties were measured by galvanostatic charge/discharge cycling as shown in FIG. 15.

As various changes could be made in the above articles, compositions and methods without departing from the scope of the disclosure, it is intended that all matter contained in the above description and shown in the accompanying drawings shall be interpreted as illustrative and not in a limiting sense.

What is claimed is:

1. A cathode structure comprising a conformal coating of a lithiated transition metal oxide material formed by co-depositing via electrodeposition from a lithium source and a transition metal source on a substrate immersed in a non-aqueous electrolyte.

2. The cathode structure of claim 1, wherein the cathode structure comprises a composite structure having anopen pore porous structure.

3. The cathode structure of claim 2, wherein the composite structure has a void volume fraction (porosity) of at least 95%.

4. The cathode structure of claim 2, wherein the composite structure is an open cell porous structure comprising unit cells having an average size in a range of 10 nm to 100 μm.

5. A primary or secondary battery comprising the cathode structure according to claim 1.

6. The primary or secondary battery of claim 5, wherein the cathode structure comprises the conformal coating of the lithiated transition metal oxide material on a metal current collector.

7. The cathode structure of claim 1, wherein the substrate is selected from the group consisting of metals, metal alloys, ceramics, conductive oxides, carbon and all allotropes thereof, electrically conductive polymers, and electrically conductive composite materials.

8. The cathode structure of claim 7, wherein the substrate comprises a metals or metal alloy selected from the group consisting of aluminum, copper, chromium, cobalt, manganese, nickel, silver, gold, tin, platinum, palladium, zinc, tungsten, tantalum, rhodium, molybdenum, titanium, iron, zirconium, vanadium, hafnium, and the alloys thereof.

9. The cathode structure of claim 8, wherein the substrate is aluminum or alloy thereof.

10. The cathode structure of claim 7, wherein the substrate comprises a ceramic selected from the group consisting of borides, carbide, and silicides.

11. The cathode structure of claim 10, wherein the substrate comprises a ceramic selected from the group consisting of titanium boride, hafnium boride, magnesium boride, chromium boride, vanadium boride, aluminum boride, tungsten carbide, titanium carbide, chromium carbide, molybdenum carbide, hafnium carbide, tantalum carbide, vanadium carbide, tungsten silicide, titanium silicide, vanadium silicide, nickel silicide, platinum silicide, chromium silicide, copper silicide, and zirconium silicide.

12. The cathode structure of claim 7, wherein the substrate comprises a conductive oxide selected from the group consisting of indium tin oxide, fluorinated tin oxide, and combinations thereof.

13. The cathode structure of claim 7, wherein the substrate comprises any one of carbon and allotropes thereof, selected from the group consisting of conductive carbon particles, carbon nanotubes, carbon fibers, fullerenes, graphene, graphite, glassy carbon, and pyrolitic carbon.

14. The cathode structure of claim 7, wherein the substrate comprises electrically conductive polymers selected from the group consisting of polyaniline, polyacetylene and polypyrrole.

15. The cathode structure of claim 7, wherein the substrate comprises electrically conductive composite materials comprising polymeric materials containing a sufficient amount of a conductive filler material in the shape of particles, fibers, or sheets, the conductive filler material comprising any one of the carbon and allotropes thereof.

16. The cathode structure of claim 1, wherein the conformal coating has a thickness in the range of 1 nm to 50 µm.

17. The cathode structure of claim 1, wherein the conformal coating has a thickness in the range of 100 nm to 10 µm.

18. The cathode structure of claim 1, wherein the conformal coating has a thickness in the range of 10 nm to 100 µm.

19. The cathode structure of claim 1, wherein a thickness of the conformal coating has a variation of less than 20% of an average thickness value.

20. The cathode structure of claim 1, wherein a thickness of the conformal coating has a variation of less than 10% of an average thickness value.

21. The cathode structure of claim 1, wherein the cathode structure comprises a composite structure comprising the conformal coating of the lithiated transition metal oxide material electrodeposited on a carbon scaffold.

22. The cathode structure of claim 21, wherein the carbon scaffold consists of a single layer carbon scaffold.

23. The cathode structure of claim 1, wherein the cathode structure comprises a monolithic open porous structure.

24. The cathode structure of claim 1, wherein the cathode structure is formed by electrodepositing the lithiated transition metal oxide material from the non-aqueous electrolyte at a temperature in excess of the melting temperature of the non-aqueous electrolyte.

25. The cathode structure of claim 1, wherein the cathode structure comprising the conformal coating of the lithiated transition metal oxide material is formed by removing the electrodeposited lithiated transition metal oxide material from the substrate, combining the lithiated transition metal oxide material with a conductive material and binder to form a mixture, and applying the mixture to a current collector.

26. The cathode structure of claim 1, wherein the lithiated transition metal oxide material has the formula $Li_xM_yO_n$, where x is greater than 0 and less than 1.2, y is 0.5 to 1, n is 1.5 to 2.5, and the ratio $(2n-x)/y$ ranges from 2.5 to 3.7, and where M comprises one or more metals selected from the group consisting of Ti, V, Cr, Mn, Co, Ni, Mo, W, Zr, Mg, Al, Cu, Fe, and Zn.

27. The cathode structure of claim 26, wherein M comprises one or more metals selected from the group consisting of Co, Ni, and Mn.

28. The cathode structure of claim 1, wherein the lithiated transition metal oxide material comprises $LiCoO_2$, $LiMnO_2$, lithiated nickel oxide, or $LiNi_aMn_bCo_{1-a-b}O_2$ where a is greater than 0 and less than 1, b is greater than 0 and less than 1, and a+b is greater than 0 and less than 1.

29. The cathode structure of claim 1, wherein the transition metal source is selected from the group consisting of nitrates, nitrites, sulfates, halides, hydroxides, oxides, alkoxides and acetates of a transition metal.

30. The cathode structure of claim 29, wherein the transition metal comprises cobalt and the transition metal source comprises $CoO$, $Co_2O_3$, $Co(OH)_2$, $Co_3O_4$, $CoCl_2$, $CoSO_4$, $Co(NO_3)_2$, $Co(NO_2)_2$, $Co(C_2H_3O_2)_2$.

31. The cathode structure of claim 29, wherein the transition metal comprises manganese and the transition metal source comprises $MnCl_2$, $MnSO_4$, $Mn(CH_3COO)_2$, $Mn(NO_3)_2$, or $Mn(NO_2)_2$.

32. The cathode structure of claim 29, wherein the transition metal comprises nickel and the transition metal source comprises $NiCl_2$, $NiSO_4$, $Ni(CH_3COO)_2$, $Ni(NO_3)_2$, or $Ni(NO_2)_2$.

33. The cathode structure of claim 1, wherein the source of lithium comprises a lithium containing molten salt comprising any one or more of LiOH, LiF, LiCl, LiBr, LiI, $LiNO_3$, $LiNO_2$, and $Li_2SO_4$.

34. The cathode structure of claim 1, wherein the substrate has a thickness of at least 1 micron.

35. The cathode structure of claim 34, wherein the substrate has a thickness of at least 10 microns.

* * * * *